United States Patent
Kim et al.

(10) Patent No.: US 10,432,354 B2
(45) Date of Patent: Oct. 1, 2019

(54) METHOD AND DEVICE FOR RECOVERING ERROR WITHOUT RETRANSMISSION OF DATA FRAME IN WIRELESS LAN

(71) Applicant: LG ELECTRONICS INC., Seoul (KR)

(72) Inventors: Suhwook Kim, Seoul (KR); Kiseon Ryu, Seoul (KR); Jinyoung Chun, Seoul (KR); Wookbong Lee, Seoul (KR); Jeongki Kim, Seoul (KR); Hangyu Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/532,049

(22) PCT Filed: May 19, 2015

(86) PCT No.: PCT/KR2015/005008
§ 371 (c)(1),
(2) Date: May 31, 2017

(87) PCT Pub. No.: WO2016/088957
PCT Pub. Date: Jun. 9, 2016

(65) Prior Publication Data
US 2017/0331587 A1    Nov. 16, 2017

Related U.S. Application Data

(60) Provisional application No. 62/086,140, filed on Dec. 1, 2014, provisional application No. 62/096,511, filed on Dec. 23, 2014.

(51) Int. Cl.
*H04L 1/00* (2006.01)
*H04L 1/16* (2006.01)
(Continued)

(52) U.S. Cl.
CPC .............. *H04L 1/0045* (2013.01); *H04L 1/00* (2013.01); *H04L 1/0041* (2013.01); *H04L 1/16* (2013.01);
(Continued)

(58) Field of Classification Search
CPC ... H04L 1/0045; H04L 1/0041; H04L 1/1607; H04L 5/0055; H04L 1/00; H04L 1/16;
(Continued)

(56) References Cited

U.S. PATENT DOCUMENTS

| | | | |
|---|---|---|---|
| 2003/0012212 A1 | 1/2003 | Earnshaw et al. | |
| 2004/0023674 A1* | 2/2004 | Miller ................. | H04L 27/0012 455/462 |

(Continued)

FOREIGN PATENT DOCUMENTS

| | | |
|---|---|---|
| EP | 1626519 | 2/2006 |
| EP | 2506451 | 10/2012 |

(Continued)

OTHER PUBLICATIONS

PCT International Application No. PCT/KR2015/005008, International Search Report dated Aug. 27, 2015, 3 pages.

(Continued)

*Primary Examiner* — April Y Blair
*Assistant Examiner* — Dipakkumar B Gandhi
(74) *Attorney, Agent, or Firm* — Lee, Hong, Degerman, Kang & Waimey

(57) ABSTRACT

Disclosed are a method and a device for recovering an error without the retransmission of a data frame in a wireless LAN. The method for recovering an error in a wireless LAN may comprise the steps in which: a sender STA transmits a data frame to a receiver STA; if the sender STA does not receive a block ACK frame of the data frame from the receiver STA, the sender STA determines the reason for the (Continued)

non-reception of the data frame; if the sender STA determines that the reason for the non-reception of the data frame is the failure of transmission of the block ACK frame after the receiver STA receives the data frame, the sender STA transmits a PBAR data frame to the receiver STA; and the sender STA receives a PBAR block ACK frame from the receiver STA as a response to the PBAR data frame.

10 Claims, 25 Drawing Sheets

(51) Int. Cl.
*H04L 5/00* (2006.01)
*H04W 72/04* (2009.01)
*H04L 21/00* (2006.01)
*H04W 84/12* (2009.01)
*H04L 1/12* (2006.01)

(52) U.S. Cl.
CPC .......... *H04L 1/1607* (2013.01); *H04L 1/1614* (2013.01); *H04L 1/1685* (2013.01); *H04L 5/0055* (2013.01); *H04W 72/04* (2013.01); *H04L 2001/125* (2013.01); *H04W 84/12* (2013.01)

(58) Field of Classification Search
CPC ............. H04L 1/1685; H04L 2001/125; H04L 1/1614; H04W 72/04; H04W 84/12
See application file for complete search history.

(56) References Cited

U.S. PATENT DOCUMENTS

| | | | |
|---|---|---|---|
| 2005/0238016 A1* | 10/2005 | Nishibayashi | H04L 1/1614 370/389 |
| 2010/0189056 A1* | 7/2010 | Nishibayashi | H04L 1/1671 370/329 |
| 2011/0096710 A1 | 4/2011 | Liu et al. | |

FOREIGN PATENT DOCUMENTS

| | | | | |
|---|---|---|---|---|
| EP | 2506451 A2 * | 10/2012 | | H04B 7/0452 |
| JP | 2006121199 | 5/2006 | | |
| JP | 2006129393 | 5/2006 | | |
| WO | 2014014577 | 1/2014 | | |
| WO | 2014036168 | 3/2014 | | |

OTHER PUBLICATIONS

European Patent Office Application Serial No. 15864516.8, Search Report dated Jul. 9, 2018, 8 pages.
Kowalski, et al., "IEEE P802.11 Wireless LANs—Proposal for 802.11n", doc.: IEEE 802.11-04/938r2, Aug. 2004, 19 pages.
Japan Patent Office Application 2017-528997, Office Action dated May 7, 2018, 3 pages.
Japan Patent Office Application Serial No. 2017-528997, Office Action dated Oct. 25, 2018, 3 pages.

* cited by examiner

FIG. 1
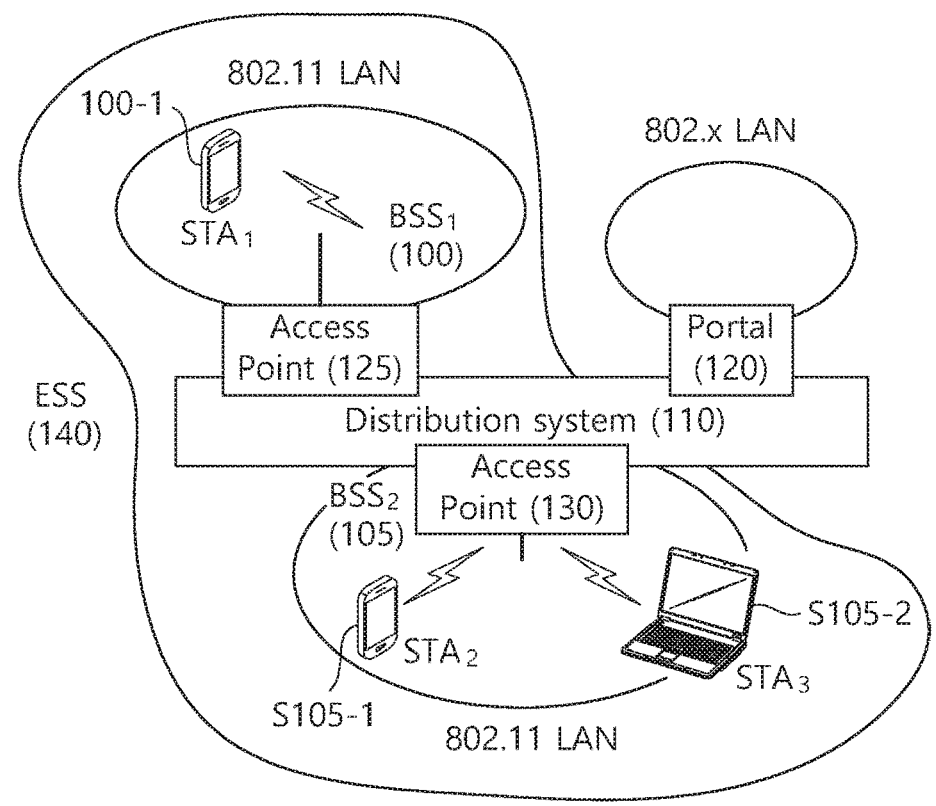
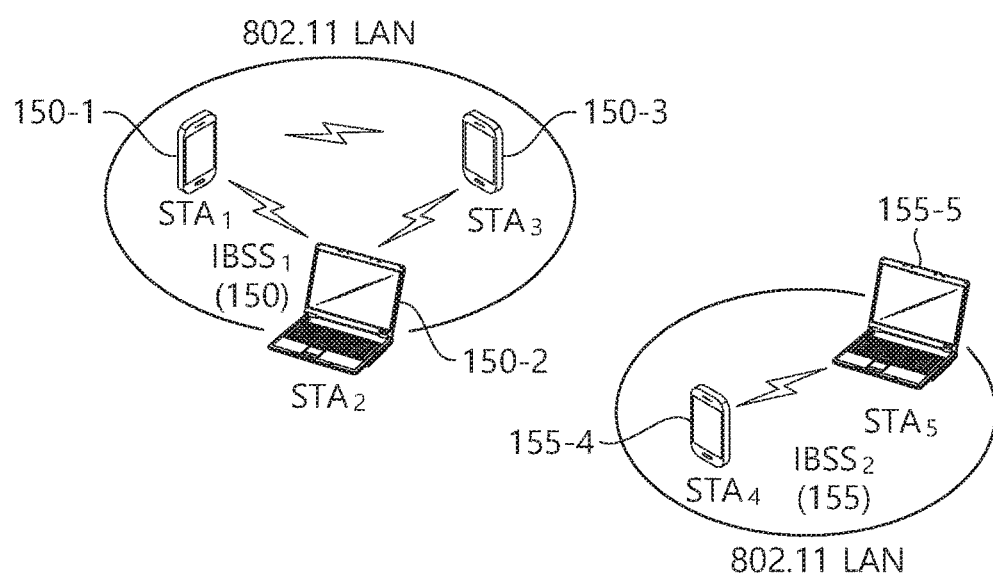

FIG. 5
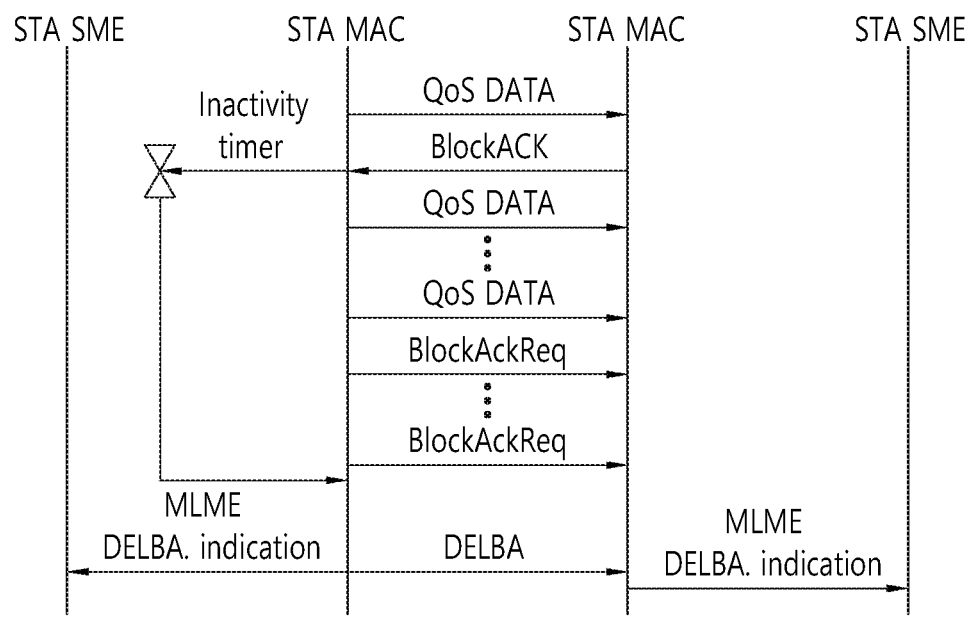
(a) Transmitting end
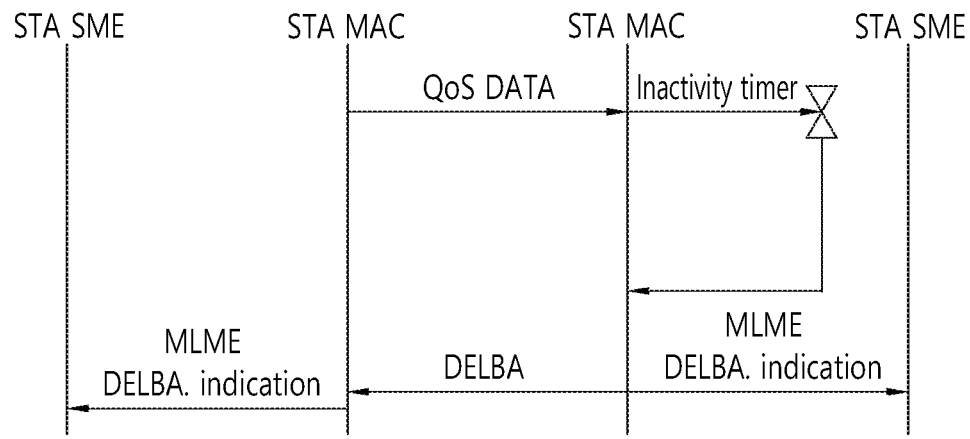
(b) Receiving end

METHOD AND DEVICE FOR RECOVERING ERROR WITHOUT RETRANSMISSION OF DATA FRAME IN WIRELESS LAN

CROSS-REFERENCE TO RELATED APPLICATIONS

This application is the National Stage filing under 35 U.S.C. 371 of International Application No. PCT/KR2015/005008, filed on May 19, 2015, which claims the benefit of U.S. Provisional Applications No. 62/086,140, filed on Dec. 1, 2014 and 62/096,511 filed on Dec. 23, 2014, the contents of which are all hereby incorporated by reference herein in their entirety.

BACKGROUND OF THE INVENTION

Field of the Invention

The present invention relates to wireless communication and, most particularly, to a method and device for recovering an error without retransmission of a data frame in a wireless LAN.

Related Art

A block acknowledgement (ACK) mechanism was adopted in order to allow a receiving end to simultaneously respond (or perform a response) to a plurality of frames that are transmitted by a transmitting end during a transmission opportunity (TXOP) duration. In case the block ACK mechanism is used, the network overhead may be reduced and the MAC efficiency may be enhanced, just as an aggregated-medium access control (MAC) service data unit (A-MSDU) and an aggregated MAC-protocol data unit (A-MPDU).

A set up process for requesting a block ACK session and receiving a corresponding response may be performed as described below.

The transmitting end may transmit an add block acknowledgement (ADDBA) request frame, which corresponds to a management frame, to the receiving end and may then request a block ACK agreement corresponding to a current traffic identifier (TID). The ADDBA request frame may include information on a block ACK policy, a transmission buffer size, a session timeout value, a starting sequence number (SSN), and so on.

The receiving end receiving the ADDBA request frame may transmit an ADDBA response frame to the transmitting end as a response to the ADDBA request frame. The ADDBA response frame may include information on a block ACK agreement status, an ACK policy, a buffer size, and a timeout value.

The transmitting end may transmit a plurality of frame to the receiving end based on a block ACK session, which is configured (or set up) through the setup process, and, then, the transmitting end may receive a block ACK frame from the receiving end.

If a block acknowledgement request (BAR) transmission condition is satisfied, the transmitting end may transmit a BAR frame to the receiving end. The receiving end may receive a BA frame as a response to the BAR frame.

In case the configured timeout value is expired, or in case there no longer exist any data that are to be transmitted for the corresponding TID, the block ACK session may be ended based on a transmission of a delete block acknowledgement (DELBA) performed by the transmitting end.

SUMMARY OF THE INVENTION

Technical Objects

An object of the present invention is to provide a method for recovering an error without retransmission of a data frame in a wireless LAN.

Another object of the present invention is to provide a device for recovering an error without retransmission of a data frame in a wireless LAN.

Technical Solutions

In order to achieve the above-described technical object of the present invention, according to an aspect of the present invention, an error recovery method in a wireless LAN system may include the steps of transmitting, by a transmitting station (STA), a data frame to a receiving STA, in case the transmitting STA fails to receive a block acknowledgement (ACK) frame corresponding to the data frame from the receiving STA, determining, by the transmitting STA, a non-reception cause of the data frame, and, in case the transmitting STA determines the non-reception cause of the data frame as a transmission failure of the block ACK frame by the receiving STA after receiving the data frame, transmitting, by the transmitting STA, previous block acknowledgement request (PBAR) data frame to the receiving STA, and receiving, by the transmitting STA, a previous block acknowledgement response (PBAR) block ACK frame from the receiving STA as a response to the PBAR data frame, wherein the PBAR data frame may include information for requesting a first block ACK bitmap corresponding to the data frame, and wherein the PBAR block ACK frame may include the first block ACK bitmap corresponding to the data frame.

In order to achieve the above-described technical object of the present invention, according to another aspect of the present invention, a transmitting station (STA) transmitting data units in a wireless LAN may include a radio frequency (RF) unit transmitting and receiving radio signals, and a processor being operatively connected to the RF unit, wherein the processor is configured to transmit a data frame to a receiving STA, to determine a non-reception cause of the data frame, in case the transmitting STA fails to receive a block acknowledgement (ACK) frame corresponding to the data frame from the receiving STA, and to transmit previous block acknowledgement request (PBAR) data frame to the receiving STA, in case the transmitting STA determines the non-reception cause of the data frame as a transmission failure of the block ACK frame by the receiving STA after receiving the data frame, and to receive a previous block acknowledgement response (PBAR) block ACK frame from the receiving STA as a response to the PBAR data frame, wherein the PBAR data frame may include information for requesting a first block ACK bitmap corresponding to the data frame, and wherein the PBAR block ACK frame may include the first block ACK bitmap corresponding to the data frame.

Effects of the Invention

During an error recovery procedure, the unnecessary retransmission of data frames may be reduced.

BRIEF DESCRIPTION OF THE DRAWINGS

FIG. 1 is a conceptual view illustrating the structure of a wireless local area network (WLAN).

FIG. 5 illustrates a block ACK operation.

DESCRIPTION OF EXEMPLARY EMBODIMENTS

Figure 2:
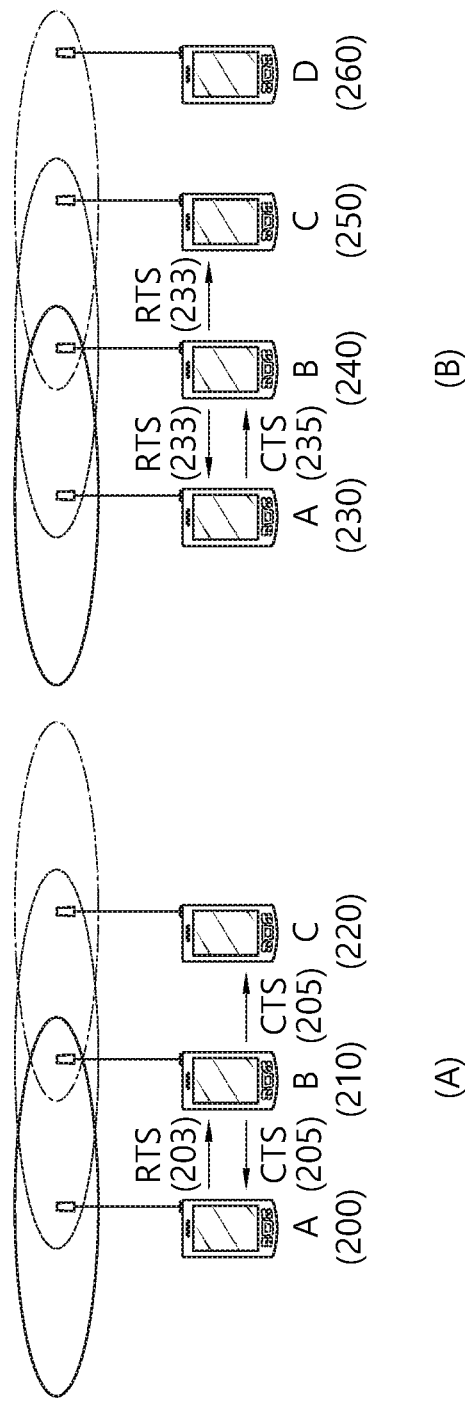
FIG. 2 is a conceptual view illustrating a method for using a RTS frame and a CTS frame for resolving a hidden node issue and an exposed node issue.

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region. The BSS 105 may include one or more STAs 105-1 and 105-2 which may be joined to one AP 130.

The BSS may include at least one STA, APs providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network configured by connecting one or more APs 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

In the BSS illustrated in the upper part of FIG. 1, a network between the APs 125 and 130 and a network between the APs 125 and 130 and the STAs 100-1, 105-1, and 105-2 may be implemented. However, the network is configured even between the STAs without the APs 125 and 130 to perform communication. A network in which the communication is performed by configuring the network even between the STAs without the APs 125 and 130 is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

An access point (AP), which operates in a wireless local area network (WLAN) system, may transmit data to each of a plurality of stations (STAs) through the same time resource. If a transmission from the AP to the STA is referred to a downlink transmission, a transmission performed by such AP to each of a plurality of STAs may be expressed by using the term downlink multi-user transmission (DL MU transmission) (or downlink multiple user transmission).

FIG. 2 is a conceptual view illustrating a method for using a RTS frame and a CTS frame for resolving a hidden node issue and an exposed node issue.

Referring to FIG. 2, in order to resolve the hidden node issue and the exposed node issue, short signaling frames, such as a request to send (RTS) frame and a clear to send (CTS) frame, and so on, may be used. Neighboring STAs may know whether or not data transmission or data reception is performed between two STAs based on the RTS frame and the CTS frame.

(A) of FIG. 2 illustrates a method for transmitting a RTS frame 203 and a CTS frame 205 in order to resolve the hidden node issue.

A case when both STA A 200 and STA C 220 intend to transmit data frames to STA B 210 may be assumed herein. Before the data frame transmission, STA A 200 may transmit an RTS frame 203 to STA B 210, and STA B 210 may transmit a CTS frame 205 to STA A 200. STA C 220 may overhear the CTS frame 205 and may know (or be informed) of the data frame transmission that is performed from STA A 200 to STA B 210 through a medium. STA C 220 may configure a network allocation vector (NAV) until the end of the data frame transmission from STA A 200 to STA B 210. By using this method inter-frame collision (or collision between frames) that is caused by hidden nodes may be prevented.

(B) of FIG. 2 illustrates a method for transmitting a RTS frame 233 and a CTS frame 235 in order to resolve the exposed node issue.

STA C 250 may determine whether or not collision occurs when transmitting a frame to another STA D 260 based on monitoring of the RTS frame 233 and the CTS frame 235 of STA A 230 and STA B 240.

STA B 240 may transmit the RTS frame 233 to STA A 230, and STA A 230 may transmit the CTS frame 235 to STA B 240. STA C 250 may overhear only the RTS frame 233 that is transmitted by STA B 240 and cannot overhear the CTS frame 235 that is transmitted by STA A 230. Therefore, STA C 250 may know that STA A 230 exists outside of a carrier sensing range of STA C 250. Therefore, STA C 250 may transmit data to STA D 260.

Description of a RTS frame format and a CTS frame format are disclosed in 8.3.1.2 RTS frame format and 8.3.1.3 CTS frame format of IEEE P802.11-REVmcTM/D2.0, October 2013.

Figure 3:
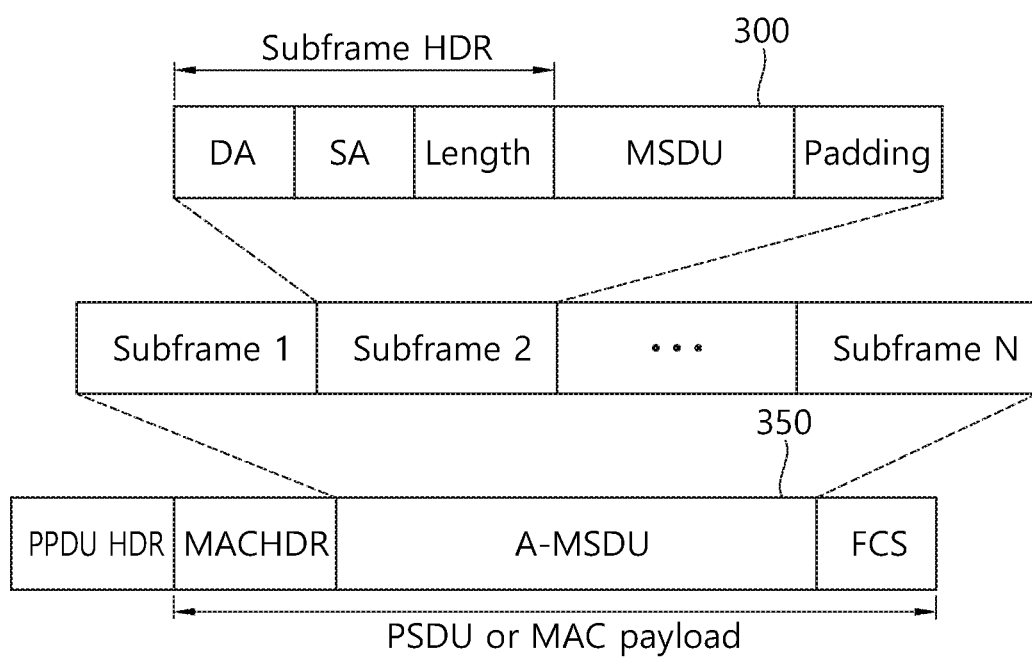
FIG. 3 is a conceptual diagram illustrating an A-MSDU.

FIG. 3 is a conceptual diagram illustrating an A-MSDU.

In a wireless LAN system, a method for performing aggregation on a data frame in order to reduce medium access control (MAC) error overhead has been defined. A MAC service data unit (MSDU) 300, which is generated in an application layer for the aggregation of the data frame, may be processed with aggregation (i.e., aggregated) in a higher layer of the MAC layer so as to be generated as a single data unit. The MSDU that is aggregated in the higher layer of the MAC layer may be defined by using the term aggregate-MSDU (A-MSDU) 350. The A-MSDU 350 may be generated based on an aggregation of multiple MSDUs 300 each having the same priority level and each having the same receiver address (RA).

A plurality of A-MSDU subframes may be grouped so as to form a single A-MSDU 350. More specifically, the A-MSDU 350 may include a plurality of A-MSDU subframes, and an A-MSDU subframe may include a subframe header, an MSDU, and a padding bit. The subframe header may include a destination address (DA), a source address (SA), and a MSDU length. The padding bit may be used in order to configure a total length of the A-MSDU subframe to have a total length that is equal to a multiple of a predetermined number (e.g., a multiple of 4 octets).

Unlike the single MSDU, instead of being fragmented (or processed with fragmentation), the A-MSDU 350 may be configured as a QoS data MAC protocol data unit (MPDU) and may then be transmitted. For example, the A-MSDU 350 may be transmitted by a high throughput (HT) STA of a management information base (MIB) field. An HT STA has a capability of performing de-aggregation of the A-MSDU 350, and the HT-STA verifies whether or not an a-MSDU 350 exists in a QoS field of a MAC header of the received PPDU, and, then, the HT STA may de-aggregate the A-MSDU 350.

In case the ACK policy of the HT STA is configured as a normal ACK, the A-MSDU 350 may not be aggregated as an A-MPDU. Additionally, whether or not the A-MSDU 350 can be aggregated to the A-MPDU may vary depending upon whether or not a block acknowledgement (ACK) agreement has been established (or made) for each traffic identifier (TID). Additionally, even if a block ACK agreement has been established with respect to a TID, in case an A-MSDU block ACK supportability indicator of an add block acknowledgement (ADDBA) response frame of the receiving end corresponding to the add block acknowledgement (ADDBA) request frame indicates that block ACK is not supported, the A-MSDU 350 may not be included in the A-MPDU.

Figure 4:
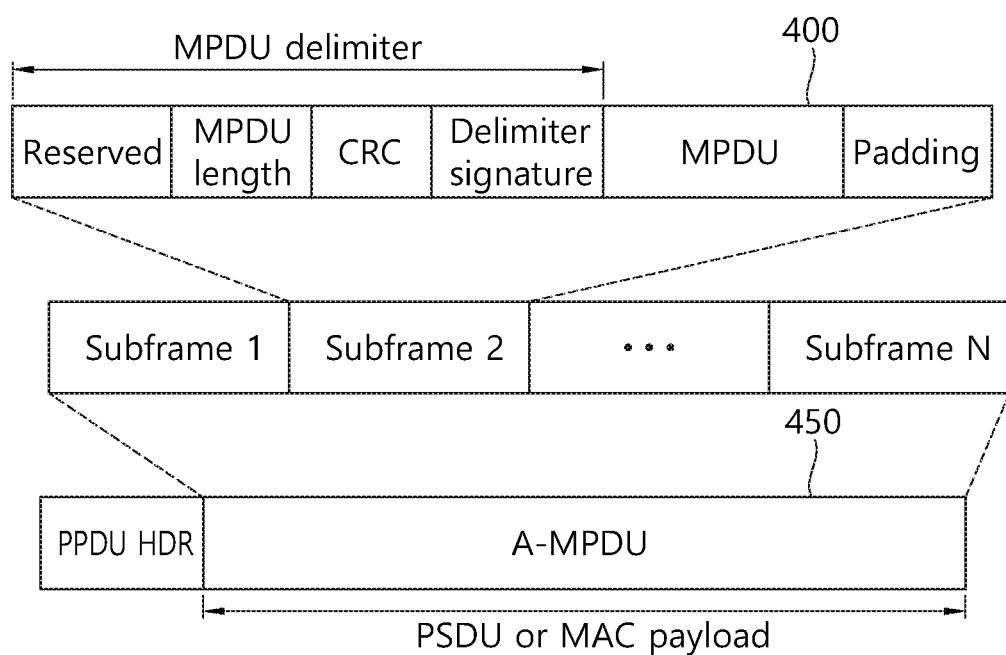
FIG. 4 is a conceptual diagram illustrating an A-MPDU.

FIG. 4 is a conceptual diagram illustrating an A-MPDU.

Referring to FIG. 4, a single A-MPDU 450 may be configured at a lower portion of the MAC layer by grouping multiple MPDUs 300 each having the same receiver address (RA), TID, and ACK policy.

The A-MPDU 450 is configured of one or more A-MPDU subframes, and each A-MPDU subframe may include an MPDU delimeter and an MPDU 400. An MPDU delimeter may be used in order to determine whether or not an error exists in the A-MPDU subframe(s) configuring the A-MPDU 450. Multiple A-MPDU subframes may configure a single A-MPDU 450.

Whether or not the reception of the A-MPDU 450 is successful may be indicated based on a block ACK. The A-MPDU 450 may be configured only for a TID that has established an HT-immediate BA agreement, and values of duration/ID fields of the MPDU 400 configuring the A-MPDU 450 may be set to be equal to one another.

The A-MPDU (or MPDU) may be included in a physical layer (PHY) service data unit (PSDU). A PSDU and a PPDU header (PHY preamble and PHY header) may configure a PHY protocol data unit (PPDU). The A-MPDU (or MPDU) may also be interpreted as a data unit that is equal to a frame.

FIG. 5 illustrates a block ACK operation.

The block ACK mechanism was adopted for the transmission of a block ACK frame including ACK information corresponding to the multiple frames, which were transmitted during a transmission opportunity (TXOP) duration (or period). In case the block ACK mechanism is used, just as in the A-MSDU or A-MPDU, the overhead for the data transmission and reception procedures may be decreased, and the efficiency of the MAC layer may be decreased.

Referring to FIG. 5, the block ACK transmission corresponding to an A-MPDU of one TID may be performed based on a setup procedure, a transmission procedure, and a tear down procedure. The setup procedure may correspond to a procedure requesting for a block ACK session and responding to the request.

As an identifier that can be used by a higher layer, the TID may be used to identify the MSDU. For example, the TID may have 16 values that are identified based on a traffic stream (TS) and a traffic category (TC). The TID may be allocated to the MSDU from a higher layer that is higher than the MAC layer. The TC may be used to identify MSDUs having different user priority levels. The TS may indicate a group of MSDUs being transmitted based on a specific traffic specification (TSPEC). The TSPEC may indicate specific quality of service (QoS) characteristics of a data flow between STAs.

During the transmission procedure, the STA of the transmitting end (hereinafter referred to as the transmitting STA) may transmit consecutive data to the STA of the receiving end (hereinafter referred to as the receiving STA), and the receiving STA may transmit an aggregated response corresponding to the consecutive data to the transmitting STA.

During the tear down procedure, the setup block ACK may be torn down (or cancelled).

More specifically, during the setup procedure, the transmitting STA may transmit an add block acknowledgement (ADDBA) request frame to the receiving STA, and the receiving STA may transmit an ADDBA response frame to the transmitting STA. More specifically, the transmitting STA may transmit an ADDBA request frame, which corresponds to a management frame, to the receiving STA. The ADDBA request frame may request a block ACK agreement corresponding to the current TID. The ADDBA request frame may transmit information on block ACK policy types, transmission buffer size of the transmitting STA, a timeout value of a block ACK session, a starting sequence number (SSN), and so on, to the receiving STA. After receiving the ADDBA request frame, the receiving STA may transmit an ADDBA response frame to the transmitting STA as a response to the received ADDBA request frame. The ADDBA response frame may include a block ACK agreement status, an ACK policy, a buffer size, a timeout value, and so on.

During the transmission procedure, the transmitting STA may transmit an A-MPDU to the receiving STA. In case the transmission condition of a block ACK request (BAR) frame corresponding to the A-MPDU is satisfied, the transmitting STA may transmit a BAR frame to the receiving STA. In case the transmission of the A-MPDU performed by the transmitting STA is successful, the receiving STA that has received the BAR frame may transmit a block ACK corresponding to the A-MPDU to the transmitting STA.

The tear down procedure may be carried out in case set up time values of inactivity timers, which are set up in the transmitting STA and the receiving STA, are expired, or if there are no more data that are to be transmitted with respect to the corresponding TID. For example, with the expiration of the timeout value set up in the inactivity timer for block ACK error recovery, a delete block acknowledgement (DELBA) frame may be transmitted to the receiving STA or the transmitting STA, and, then, the block ACK session may be ended. In case the transmitting STA receives the block ACK, the inactivity timer of the transmitting STA may be re-set. In case the receiving STA receives the MPDU and the block ACK request frame, the inactivity timer of the receiving STA may be re-set.

The block ACK frame may include a block ACK start sequence control field and a block ACK bitmap.

The block ACK start sequence control field may include information on a sequence number of a data unit that is indicated by a first bit being included in the block ACK bitmap. In other words, the block ACK start sequence control field may include information on a starting sequence number (SSN), which corresponds to a sequence number of a data unit that is indicated by a first bit being included in the block ACK bitmap.

Each of a plurality of bits being included in the block ACK bitmap may indicate the success or failure in the decoding for each of a plurality of data units (e.g., MSDU). The first bit being included in the block ACK bitmap may indicate the success or failure in the reception of the data unit of the sequence number, which is indicated by the block ACK start sequence control field. The remaining bits that are included in the block ACK bitmap may sequentially indicate the success or failure in the decoding of the data units corresponding to the remaining sequences. More specifically, an $n^{th}$ bit being included the block ACK bitmap may indicate the success or failure in the reception of a data unit having a sequence number corresponding to SSN+n.

The block ACK bitmap may have a compressed format. A bit that is included in the block ACK bitmap having the compressed format may also indicate the success or failure in the reception of a plurality of data units (e.g., 64 MSDUs and A-MSDU).

Furthermore, in addition to the block ACK bitmap corresponding to only one TID, in accordance with the configuration, the block ACK bitmap may also include block ACK bitmaps corresponding to a plurality of TIDs.

Figure 6:
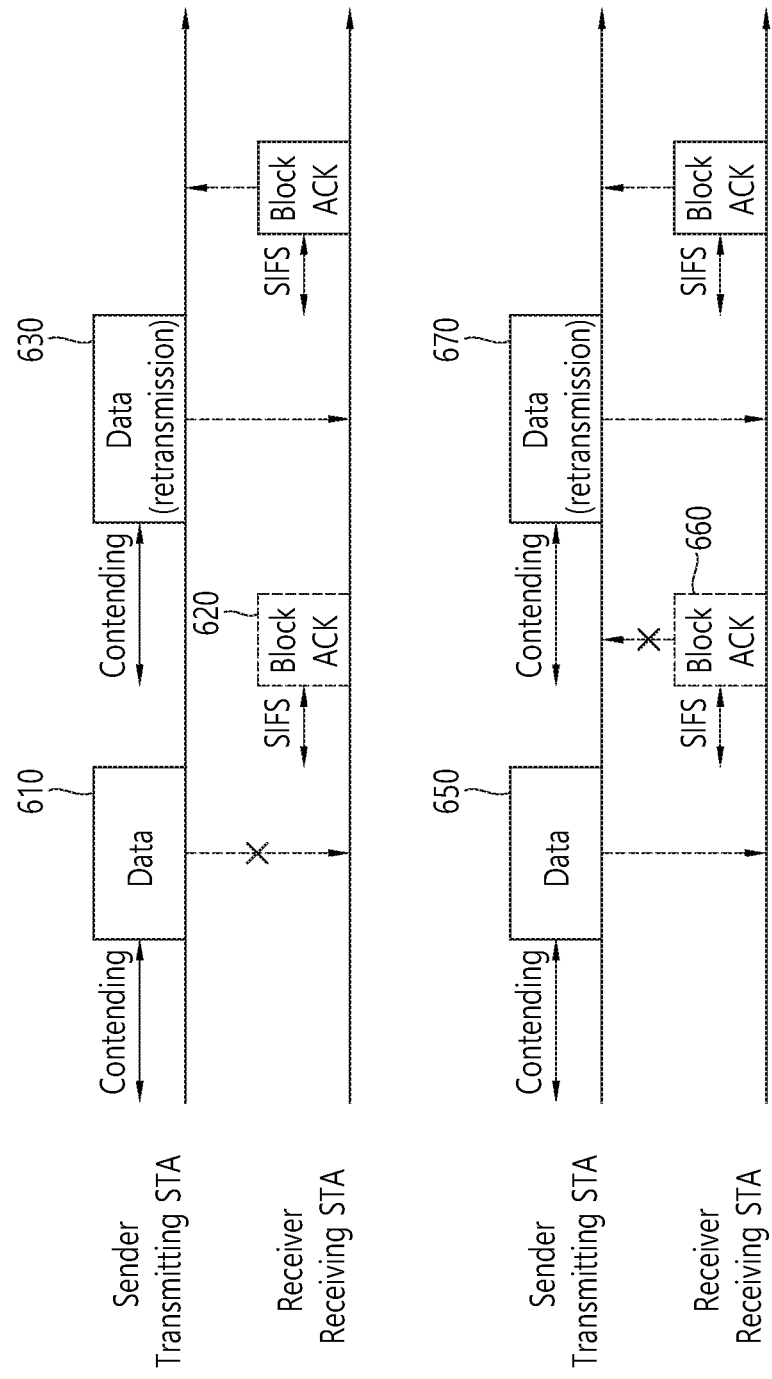
FIG. 6 illustrates an error recovery procedure in a legacy wireless LAN system.

FIG. 6 illustrates an error recovery procedure in a legacy wireless LAN system.

The error recovery procedure may occur due to a transmission failure of a data frame being transmitted from a transmitting STA to a receiving STA (or a transmission failure of a data frame of the transmitting STA), or a transmission failure of a block ACK frame being transmitted from the receiving STA to the transmitting STA as a response to the data frame (or a transmission failure of a block ACK frame of the receiving STA).

An upper part of FIG. 6 discloses a transmission failure of a data frame of the transmitting STA.

Referring to the upper part of FIG. 6, in case a data frame 610 fails to be transmitted by the transmitting STA in the conventional wireless LAN system, the receiving STA may not transmit a block ACK frame 620. In case the transmission of the data frame 610 is successful, the receiving STA may transmit the block ACK frame 620 to the transmitting STA based on a short interframe space (SIFS).

After the transmitting STA transmits the data frame 610, the transmitting STA may monitor the transmission of the block ACK frame 620, which is transmitted as a response to the data frame 610 based on the SIFS. In case the transmitting STA fails to receive the block ACK frame 620, re-transmission of a data frame 630 may be performed. In case the transmission of the data frame 610 fails, the receiving STA cannot receive the data frame 610, and the transmitting STA cannot receive the block ACK frame 620 as a response to the data frame 610. Therefore, a re-transmission of the data frame 630 from the transmitting STA may be mandatorily required.

A lower part of FIG. 6 discloses a receiving of a block ACK frame of the transmitting STA.

Referring to the lower part of FIG. 6, the receiving STA may successfully perform decoding on the data frame 650, which is transmitted from the transmitting STA, and, then, the receiving STA may transmit a block ACK frame 660 to the transmitting STA. In case an error occurs in the block ACK frame 660, which is transmitted to the transmitting STA from the receiving STA, the transmitting STA cannot receive the block ACK frame 660. In case the transmitting STA fails to receive the block ACK frame 660, the transmitting STA may re-transmit a data frame 670. The receiving STA may re-receive the data frame 650, which is re-transmitted by the transmitting STA, and which was previously successfully received by the receiving STA. The re-reception of the data frame 650 by the receiving STA, which has previously successfully received the data frame 650 may reduce efficiency in the wireless LAN communication. More specifically, in case a transmission failure of the block ACK frame 660 by the receiving STA occurs, unconditional re-transmission of the data frame 670 by the transmitting STA may reduce the wireless LAN communication efficiency.

Hereinafter, in the exemplary embodiment of the present invention, in case the reception of the data frame by the receiving STA is successful and the reception of the ACK frame by the transmitting STA fails due to an error in the block ACK frame, which is transmitted by the receiving STA as a response to the data frame (i.e., in case a transmission failure of the block ACK frame by the receiving STA occurs), an effective error recovery procedure will be disclosed.

An AP operating in the wireless LAN system may transmit data to each of the plurality of STAs through an overlapped time resource. If a transmission from the AP to the STA is referred to as a downlink transmission, such transmission of the AP may also be expressed by using the term downlink multi-user transmission (DL MU transmission) (or downlink multiple user transmission). Conversely, a DL single user (SU) transmission may indicate a downlink transmission from the AP to one STA within the entire transmission resource.

In the legacy wireless LAN system, the AP was capable of performing DL MU transmission based on multiple input multiple output (MU MIMO), and such transmission may be expressed by using the term DL MU MIMO transmission. In the exemplary embodiment of the present invention, the AP may perform DL MU transmission based on an orthogonal frequency division multiplexing access (OFDMA), and such transmission may be expressed by using the term DL MU OFDMA transmission. In case the DL MU OFDMA transmission is performed, the AP may transmit downlink data (or downlink frames, downlink PPDUs) to each of the multiple STAs through each of the multiple frequency resources within an overlapped time resource. The DL MU OFDMA transmission may be used along with the DL MU MIMO transmission. For example, a DL MU MIMO transmission that is based on a plurality of space-time streams (or spatial streams) within a specific subband (or sub channel), which is allocated for the DL MU OFDMA transmission.

Each of the PPDU, frame, and data that are transmitted via downlink transmission may be respectively expressed by using the terms downlink PPDU, downlink frame, and downlink data. The PPDU may correspond to a data unit including a PPDU header and a physical layer service data unit (PSDU) (or MAC protocol data unit (MPDU) or MAC payload). The PPDU header may include a PHY header and a PHY preamble. And, the PSDU (or MPDU) may correspond to a data unit including a frame or may correspond to a frame.

Conversely, a transmission from an STA to the AP may be referred to as an uplink transmission, and the transmission of data from multiple STAs to the AP within the same time resource may be expressed by using the term uplink multi-user transmission (or uplink multiple user transmission). A UL SU transmission may indicate an uplink transmission from one STA to one AP within the entire transmission resource. Unlike the legacy wireless LAN system, which only authorizes UL SU transmission, in the wireless LAN system according to the exemplary embodiment of the present invention, the UL MU transmission may also be supported. Each of the PPDU, frame, and data that are transmitted via uplink transmission may be respectively expressed by using the terms uplink PPDU, uplink frame, and uplink data. The uplink transmission that is performed by each of the multiple STAs may be performed within a frequency domain or a spatial domain.

In case the uplink transmission that is performed by each of the multiple STAs is performed within the frequency domain, different frequency resources corresponding to each of the multiple STAs may be allocated as uplink transmission resources based on OFDMA. Each of the multiple STAs may transmit an uplink frame to the AP by using the respective frequency resources allocated to each STA. Such transmission method using different frequency resources may also be expressed by using the term UL MU OFDMA transmission method.

In case the uplink transmission that is performed by each of the multiple STAs is performed within the spatial domain, different space time streams (or spatial streams) are allocated to each of the multiple STAs, and each of the multiple STAs may transmit an uplink frame to the AP by using different space time streams. Such as transmission method using different spatial streams may also be expressed by using the term UL MU MIMO transmission method.

A UL MU OFDMA transmission may be performed along with a UL MU MIMO transmission. For example, a UL MU MIMO transmission that is based on a plurality of space-time streams (or spatial streams) within a specific subband (or sub channel), which is allocated for the UL MU OFDMA transmission.

Hereinafter, the exemplary embodiment of the present invention discloses an error recovery procedure that is based on DL MU transmission/DL SU transmission and UL MU transmission/UL SU transmission in a wireless LAN system.

Hereinafter, for simplicity in the description, an STA transmitting a data frame will be expressed by using the term transmitting STA, and an STA transmitting a block ACK frame as a response to the data frame will be expressed by using the term receiving STA. For example, in case the transmitting STA corresponds to an AP STA, the receiving STA may correspond to a non-AP STA, and, in case the transmitting STA corresponds to a non-AP STA, the receiving STA may correspond to an AP STA.

Figure 7:
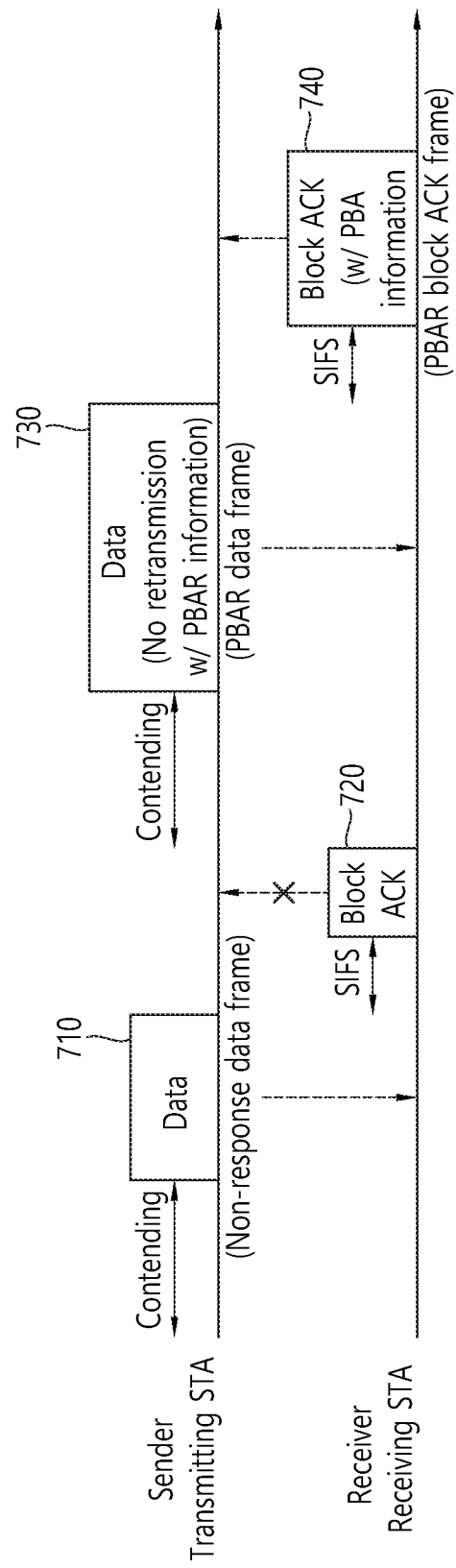
FIG. 7 is a conceptual view illustrating an error recovery procedure according to an exemplary embodiment of the present invention.

FIG. 7 is a conceptual view illustrating an error recovery procedure according to an exemplary embodiment of the present invention.

In FIG. 7, the transmitting STA may acquire transmission authority for transmitting a data frame through a medium based on channel access and may then transmit a data frame to the receiving STA.

In case the receiving STA successfully receives the data frame 710, the receiving STA may transmit a block ACK frame 720 as a response to the data frame 710 at inter-frame intervals by using the SIFS. The block ACK frame 720 may include a block ACK bitmap (or block ACK information) including ACK information on each of the plurality of data units (e.g., MSDUs), which are included in the data frame 710. Each of the plurality of bits included in the block ACK bitmap may indicate the success or failure in the reception of the each of the plurality of data units.

Due to a transmission failure of the data frame 710 by the transmitting STA or a transmission failure of the block ACK frame 720 by the receiving STA, the transmitting STA may not be capable of receiving the block ACK frame 720 within a predetermined period of time (e.g., SIFS+a) after the transmission of the data frame 710. The case when the transmitting STA fails to receive the block ACK frame 720 may also include a case when the transmitting STA only succeeds in decoding part (e.g., a header of the PPDU delivering (or carrying) the block ACK frame 720) of the block ACK frame 720.

A reason (or cause) of the failure to receiving the block ACK frame 720 by the transmitting STA (cause of a non-reception of the block ACK frame) may correspond to one of the transmission failure of the data frame 710 by the transmitting STA and the transmission failure of the block ACK frame 720 by the receiving STA.

The transmission failure of the data frame 710 by the transmitting STA, which corresponds to one of the causes of the non-reception of the block ACK frame 720 by the transmitting STA, may mean a reception failure of the data frame 710 by the receiving STA. In other words, this may mean a reception (or decoding) failure of the data frame 710, which is normally transmitted by the transmitting STA, by the receiving STA.

The transmission failure of the block ACK frame 720 by the receiving STA, which corresponds to the other cause of the non-reception of the block ACK frame 720 by the transmitting STA, may mean a transmission failure, by the receiving STA, of the block ACK frame 720, which is transmitted as a response to the data frame 710 after the successful reception (or decoding) of the data frame 710 by the receiving STA. In other words, this may mean a reception (or decoding) failure of the block ACK frame 720, which is normally transmitted by the receiving STA, by the transmitting STA.

In case the block ACK frame 720 is not received, the transmitting STA may determine whether the non-reception cause of the block ACK frame 720 corresponds to the transmission failure of the data frame 710 by the transmitting STA or the transmission failure of the block ACK frame 720 by the receiving STA. The method for determining the non-reception cause of the block ACK frame 720, which is performed by the transmitting STA, will be described below.

According to the exemplary embodiment of the present invention, in case the transmitting STA determines the non-reception cause of the block ACK frame 720 as the transmission failure of the data frame 710 by the transmitting STA, the transmitting STA may perform a re-transmission procedure corresponding to the data frame 710. In case a transmission failure of the data frame 710 by the transmitting STA occurs, the receiving STA is incapable of receiving the data frame 710. Therefore, a re-transmission of the data frame 710 to the receiving STA is required.

Conversely, in case the transmitting STA determines the non-reception cause of the block ACK frame 720 as the transmission failure of the block ACK frame 720 by the receiving STA, a re-transmission of the data frame 710 performed by the transmitting STA may not be required. Since the receiving STA has successfully received the data frame 710, the re-transmission procedure, which is performed by the transmitting STA, for all of the plurality of data units being included in the data frame 710, for which the block ACK frame 720 has failed to be received, may be unnecessary. According to the exemplary embodiment of the present invention, in case the transmitting STA determines the non-reception cause of the block ACK frame 720 as the transmission failure of the block ACK frame 720 by the receiving STA, instead of performing a re-transmission procedure of the data frame 710, for which the block ACK frame 720 has failed to be received, a next data frame 730 may be transmitted to the receiving STA. Hereinafter, in the exemplary embodiment of the present invention, the data frame 710 for which the block ACK frame 720 has failed to be received as a response to the corresponding data frame 710 due to the transmission failure of the block ACK frame 720 by the receiving STA may be expressed by using the term non-response data frame 710.

For an effective error recovery procedure, the transmitting STA may be required to re-receive block ACK information corresponding to each of the plurality of data units included in the non-response data frame 710 from the receiving STA, and to perform re-transmission of data units for which the ACK has not been received, among the plurality of data units included in the non-response data frame 710, based on the block ACK information.

Therefore, according to the exemplary embodiment of the present invention, block ACK information corresponding to the non-response data frame 710 may be transmitted through a block ACK frame 740, which is transmitted as a response to a data frame 730 being transmitted after the non-response data frame 710.

After the non-response data frame 710, the data frame 730 being transmitted by the transmitting STA may include information for requesting block ACK information corresponding to the non-response data frame 710.

For example, the data frame 730, which is transmitted by the transmitting STA after the transmission of the non-response data frame 710, may include previous block acknowledgement request (PBAR) information. The PBAR information may include information requesting block ACK information corresponding to the non-response data frame. The data frame 730 including the PBAR information may be expressed by using the term PBAR data frame 730.

The receiving STA that has received the PBAR data frame 730 may transmit a block ACK frame 740 as a response to the PBAR data frame 730. The block ACK frame 740, which is transmitted as a response to the PBAR data frame 730, may be expressed by using the term previous block acknowledgement response (PBAR) block ACK frame 740.

The PBAR block ACK frame 740 may not only include block ACK information corresponding to the data units being included in the PBAR data frame 730 but may also include block ACK information corresponding to data units being included in the non-response data frame 710.

The PBAR block ACK frame 740 may separately include PBA information for the transmission of the block ACK information corresponding to the non-response data frame 710. The PBA information may include a separate block ACK bitmap for delivering (or carrying) the block ACK information corresponding to the non-response data frame 710.

The transmitting STA may receive the PBAR block ACK frame 740. And, then, the transmitting STA may determine whether or not to perform re-transmission of the plurality of data units being included in the non-response data frame 710 and the plurality of data units being included in the PBAR data frame 730 based on the block ACK information corresponding to the PBAR data frame 743 and the block ACK information corresponding to the non-response data frame 710, which are included in the PBAR block ACK frame 740.

In case the above-described error recovery method is being used, unnecessary re-transmission of data units for which decoding has been successfully performed by the receiving STA may be reduced. Accordingly, usage efficiency of wireless resources in the wireless LAN may be enhanced, and overlapped processing for the re-transmission and re-reception of data frames performed by the transmitting STA and the receiving STA may be reduced.

In FIG. 7, a case when the non-response data frame 710 corresponds to one data frame is assumed. More specifically, one non-response data frame 710 may include an A-MSDU, which is generated by an aggregation of a plurality of MSDUs, and a block ACK frame may include ACK information corresponding to each of the plurality of MSDUs.

However, after the transmission of the plurality of data frames, one block ACK frame may be transmitted as a response to the plurality of data frames. For example, each of the plurality of data frames may include an MSDU, and a block ACK frame may include may include ACK information corresponding to each of the plurality of MSDUs that are received through the plurality of data frames. In this case, the plurality of data frames may correspond to non-response data frames.

Figure 8:
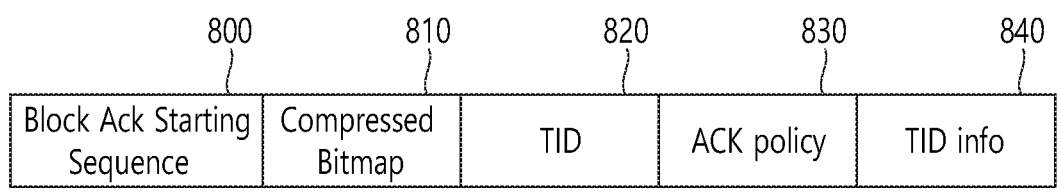
FIG. 8 is a conceptual view illustrating a PBAR information format according to an exemplary embodiment of the present invention.

FIG. 8 is a conceptual view illustrating a PBAR information format according to an exemplary embodiment of the present invention.

FIG. 8 discloses a format of the PBAR information being included in the PBAR data frame. The format of the PBAR information may be included in a MAC header of the PBAR data frame, a PPDU header of a PBAR PPDU carrying a MAC body or PBAR frame.

Referring to FIG. 8, the PBAR information format may include a block ACK starting sequence field 800, a compressed bitmap field 810, a TID field 820, an ACK policy field 830, and a TID info field 840.

The block ACK starting sequence field 800 may be used for indicating a data frame (or data unit) requesting block ACK information. For example, a plurality of MSDUs may be transmitted by the transmitting STA through a plurality of data frames. Alternatively, a plurality of MSDUs may be transmitted by the transmitting STA through one data frame in an A-MSDU format. In this case, the block ACK starting sequence field 800 being included in the PBAR transmission format may include information on a sequence number corresponding to a first data unit among the plurality of data units included in a non-response data frame. In other words, the block ACK starting sequence field 800 may include information on a sequence of a data frame (or data unit) being the first data frame to be transmitted by the transmitting STA among the data frames (or data units) requesting the re-transmission of block ACK information.

The compressed bitmap field 810 may include information on a usage or non-usage of a compressed bitmap. The compressed bitmap field 810 may indicate whether the block ACK information corresponding to the non-response data frame included in the PBAR block ACK frame corresponds to a non-compressed bitmap or a compressed bitmap.

In case a non-compressed bitmap is used, each of the plurality of bits included in the block ACK bitmap field may correspond to each of the plurality of data units. Conversely, in case a compressed bitmap is used, each of the plurality bits included in the block ACK bitmap field may correspond to a data unit group including the plurality of data units. For example, one bit may indicate the success or failure in the reception of the plurality of MSDUs.

The receiving STA may determine whether or not to use the block ACK bitmap, which is included in the PBA information of the PBAR block ACK frame, as a compressed bitmap based on the information on whether or not to use a compressed bitmap, which is indicated by the compressed bitmap field.

The TID field 820 may include information indicating a request for block ACK information corresponding to a data unit corresponding to a specific TID. In case a plurality of data units included in a non-response data frame correspond to a plurality TIDs, only the transmission of block ACK information corresponding to a data unit corresponding to a specific TID, among the plurality of data units included in a non-response data frame, may be requested based on the TID field 820. For example, among the plurality of data units included in a non-response data frame, part of the data units may correspond to data units including information for real-time phone call. Re-transmission of data frames including information on such real-time phone call may be unnecessary. Therefore, in this case, block ACK information for determining whether or not to perform re-transmission of the corresponding data unit may not be required. Therefore, only the block ACK information corresponding to the data unit corresponding to the TID, which requires re-transmission, may be requested to the receiving STA based on the TID field 820.

For example, in case the value of the TID field 820 is equal to 1, the TID info field 840 may indicate information on a specific TID requesting the block ACK information. Conversely, in case the value of the TID field 820 is equal to 0, transmission of block ACK information corresponding to all of the data units being included in a non-response data frame may be performed without considering the TID.

The ACK policy field 830 may include information on a transmission policy of the PBA information.

The PBA information may include a separate block ACK bitmap for carrying block ACK information corresponding to a non-response data frame. The PBA information may be included in the PBAR block ACK frame in accordance with the transmission policy (immediate block ACK response policy, delayed block ACK response policy, Non ACK policy) and may then be transmitted.

In case the transmission policy of the PBA information corresponds to an immediate block ACK response policy, as described above in FIG. 7, the PBAR block ACK frame including block ACK information corresponding to a non-response data frame may be immediately transmitted based on the SIFS after receiving the PBAR data frame.

In case the transmission policy of the PBA information corresponds to a delayed block ACK response policy, the PBAR block ACK frame including block ACK information corresponding to a non-response data frame may be transmitted after a predetermined period of time instead of being transmitted based on the SIFS after receiving the PBAR data frame.

In case the transmission policy of the PBA information corresponds to a Non ACK policy, block ACK information corresponding to the non-response data frame may not be transmitted. In case the transmission policy of the PBA information corresponds to a Non ACK policy, a block ACK, which is transmitted as a response to the PBAR data frame, may include only the block ACK information corresponding to the data unit included in the PBAR data frame. More specifically, a general block ACK frame may be transmitted as a response to the PBAR data frame instead of a PBAR block ACK frame, which includes the PBA information.

For example, the bit allocation for each of the fields included in the PBAR information format may correspond to the block ACK starting sequence field 800 (16 bits), the compressed bitmap field 810 (1 bit), the TID field 820 (1 bit), the ACK policy field 830 (2 bits), and the TID info field 840 (4 bits).

Figure 9:
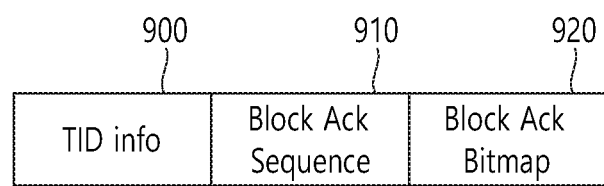
FIG. 9 is a conceptual view illustrating a PBA information format according to an exemplary embodiment of the present invention.

FIG. 9 is a conceptual view illustrating a PBA information format according to an exemplary embodiment of the present invention.

FIG. 9 discloses PBA information being included in a PBAR block ACK frame. The PBA information may include block ACK information corresponding to a non-response data frame.

Referring to FIG. 9, the PBA information format may include a TID info field 900, a block ACK sequence field 910, and a block ACK bitmap field 920.

The TID info field 900 may include information on a TID of a data unit corresponding to the block ACK information. The block ACK information may be expressed based on the block ACK bitmap field.

The block ACK sequence field 910 may include sequence information for indicating a data unit (or data frame), which is indicated by the block ACK bitmap field. For example, the block ACK sequence field 910 may include information on a sequence number of a data unit corresponding to a first bit among a plurality of bits being included in the block ACK bitmap field. Each of the plurality of bits being included in the block ACK bitmap may sequentially correspond to each of the plurality of data units in accordance with the sequence numbers corresponding to the plurality of data units.

Therefore, in case the sequence number of the data unit corresponding to the first bit being included in the block ACK bitmap field 920 is indicated by the block ACK sequence field, information on the sequence numbers corresponding to the remaining data units corresponding to the remaining bits that are included in the block ACK bitmap field 920 may be acquired.

The block ACK bitmap field 920 may include block ACK information corresponding to a non-response data frame of a bitmap format. The block ACK information, which is included in the block ACK bitmap field in accordance with the TID info field, may correspond to a data unit corresponding to a specific TID.

The block ACK bitmap field 920 may include a compressed bitmap, which is compressed in accordance with a compressed bitmap field included in the PABR information, or a non-compressed bitmap. The compressed bitmap may have a size of 8 octets, and the non-compressed bitmap may have a size of 128 octets.

In FIG. 9, a case when block ACK information corresponding to a non-response data frame is separately transmitted based on the PBA information is assumed. However, block ACK information corresponding to a non-response data frame and block ACK information corresponding to a data unit being included in the PBAR data frame may be combined so as to be transmitted as a single bitmap.

Figure 10:
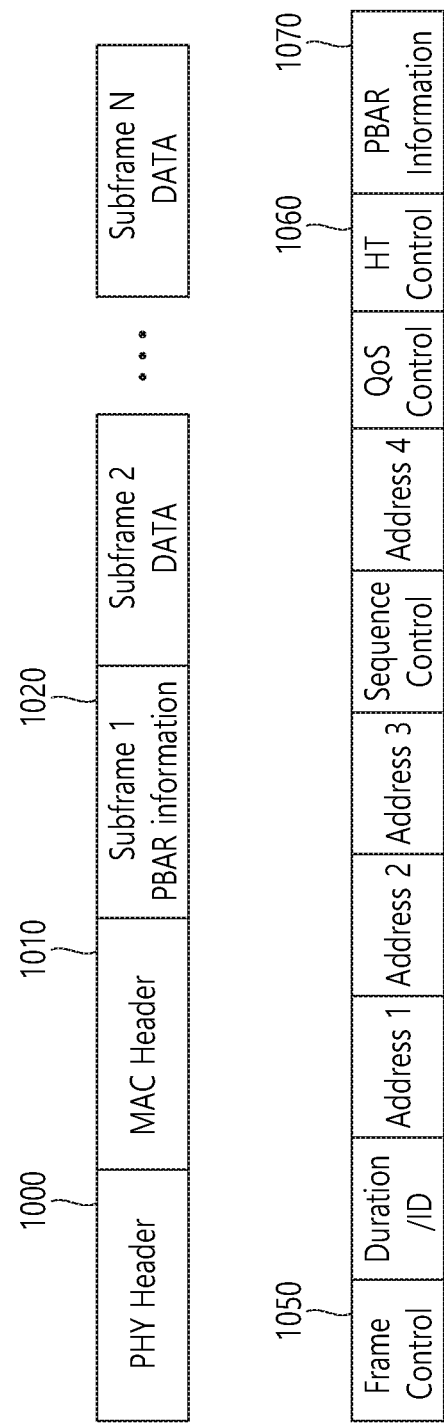
FIG. 10 is a conceptual view illustrating a data format including PBAR information according to an exemplary embodiment of the present invention.

FIG. 10 is a conceptual view illustrating a data format including PBAR information according to an exemplary embodiment of the present invention.

Referring to an upper part of FIG. 10, the PBAR information may be included as a subframe of an A-MPDU.

A PPDU carrying an A-MPDU may include a PPDU header (PHY preamble and PHY header) 1000 and an A-MPDU. The A-MPDU may include a MAC header 1010 and a plurality of A-MPDU subframes. The A-MPDU may correspond to a PBAR data frame, and, among the plurality of A-MPDU subframes being included in the A-MPDU, at least one subframe 1020 may include PBAR information. More specifically, the PBAR information may be transmitted based on an A-MPDU subframe.

The MAC header 1010 being included in the A-MPDU may include information indicating an A-MPDU subframe that includes PBAR information. In the upper part of FIG. 10, a case when the first A-MPDU subframe 1020 includes the PBAR information is assumed.

Referring to a lower part of FIG. 10, the PBAR information may be transmitted through a MAC header field, which is included in the MAC header.

A field that is included in the MAC header (MAC header field) is disclosed in 8.2.4 Frame fields of IEEE P802.11-REVmcTM/D3.1 Draft Standard for Information technology Telecommunications and information exchange between systems Local and metropolitan area networks Specific requirements Part 11: Wireless LAN Medium Access Control (MAC) and Physical Layer (PHY) Specifications.

According to the exemplary embodiment of the present invention, the MAC header may further include a PBAR information field 1070 for the transmission of the PBAR information. For example, PBAR information field 1070 may be transmitted in an order that is temporally later than an HT control field 1060.

Also, according to the exemplary embodiment of the present invention, a data frame type including uplink/downlink data and PBAR information may be defined. As a frame type, an uplink/downlink data+PBAR information frame may be defined, and a frame control field of the MAC header may indicate that the transmitted frame corresponds to a frame including the uplink/downlink data and the PBAR information. In this case, the receiving STA may decode a frame control field 1050 of the MAC header, and, after acquiring information on whether or not the PBAR information field 1070 is included in the MAC header, the receiving STA may decode the PBAR information field 1070.

More specifically, according to the exemplary embodiment of the present invention, the transmitting STA may perform a step of transmitting a data frame to the receiving STA, and, in case the transmitting STA fails to receive a block ACK frame corresponding to the data frame, a step of determining a non-reception cause of the data frame. Additionally, in case the transmitting STA determines the non-reception cause of the data frame as a failure to transmit a block ACK frame by the receiving STA after receiving the data frame, the transmitting STA may perform a step of transmitting a PBAR data frame to the receiving STA, and a step of receiving a PBAR block ACK frame from the receiving STA as a response to the PBAR data frame.

The PBAR data frame may include information for requesting a first block ACK bitmap corresponding to the data frame, and the PBAR block ACK frame may include a first block ACK bitmap corresponding to the PBAR block ACK frame.

The PBAR data frame may include PBAR information, and the PBAR information may include a block ACK starting sequence field, and the block ACK starting sequence field may include information on a sequence number of a data unit that is to correspond to a first bit a first block ACK bitmap, among the plurality of data units included in the data frame.

Additionally, the PBAR data frame may further include a TID information field, and the TID information field may include TID information, and the first block ACK bitmap may only include ACK information corresponding to a data unit, which corresponds to the TID information, among the plurality of data units being included in the data frame.

The PBAR block ACK frame may include PBA information and a second block ACK bitmap, the PBA information may include a block ACK sequence field and a first block ACK bitmap field, and the block ACK sequence field may include information on a sequence number of a data unit that is to correspond to a first bit of the first block ACK bitmap, among the plurality of data units being included in the data frame. The first block ACK bitmap field may include the first block ACK bitmap, and the first block ACK bitmap may include a plurality of ACK information sets corresponding to the plurality of data units being included in the data frame. The second block ACK bitmap field may include a plurality of ACK information sets corresponding to the plurality of data units being included in the PBAR data frame.

Moreover, the PBAR block ACK frame may further include a TID information field, and the TID information field may include TID information, and the first block ACK bitmap may only include ACK information corresponding to a data unit corresponding to the TID information among the data unit being included in the data frame.

Figure 11:
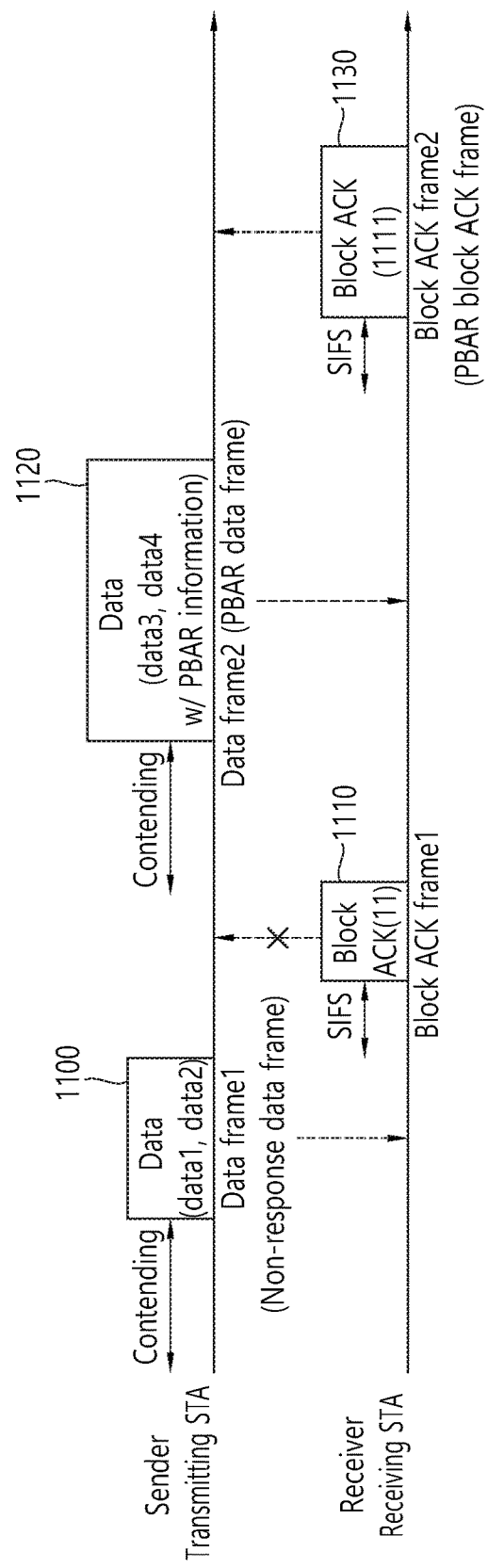
FIG. 11 is a conceptual view illustrating an error recovery method according to an exemplary embodiment of the present invention.

FIG. 11 is a conceptual view illustrating an error recovery method according to an exemplary embodiment of the present invention.

FIG. 11 discloses an error recovery method that is based on a PBAR data frame and a PBAR block ACK frame.

Referring to FIG. 11, the transmitting STA may transmit data frame1 1100, which includes data unit1 and data unit2, to the receiving STA.

The receiving STA may transmit block ACK frame1 1110, which includes block ACK bitmap '11', to the transmitting STA as a response to data frame1 1100. However, the transmitting STA may not receive block ACK frame1.

In case the transmitting STA fails to receive the block ACK frame corresponding to data frame1 1100, the transmitting STA may determine whether a non-reception cause of block ACK frame1 1110 corresponds to a transmission failure of data frame1 1100 by the transmitting STA or whether a non-reception cause of block ACK frame1 1110 corresponds to a transmission failure of block ACK frame1 1110 by the receiving STA.

Based on the determined result of the transmitting STA, in case the cause of the non-reception of block ACK frame1 1110 corresponds to the transmission failure of block ACK frame1 1110 by the receiving STA, the transmitting STA may transmit a PBAR data frame 1120.

Data frame2 1120, which is transmitted by the transmitting STA, may correspond to the PBAR data frame 1120, which includes PBAR information and new data units (e.g., data unit3 and data unit4).

The receiving STA may receive data frame2 1120, which corresponds to the PBAR data frame, and, then, the receiving STA may transmit a PBAR block ACK frame 1130 to the transmitting STA as a response to data frame2 1120.

The PBAR block ACK frame 1130 may include the above-described PBA information and block ACK information corresponding to data unit3 and data unit4 being included in data frame2 1120, which corresponds to a PBAR data frame. The PBA information may include block ACK information corresponding to data unit1 and data unit2 being included in data frame 1 1100, which corresponds to the non-response data frame.

For example, in case the receiving STA successfully receives and decodes data unit1 and data unit2, which are included in the non-response data frame 1100, and data unit3 and data unit4, which are included in the PBAR data frame 1120, a first block ACK bitmap included in the PBA information may correspond to '11', and a second block ACK bitmap including the block ACK information corresponding to data unit3 and data unit4 may also correspond to '11'.

Hereinafter, in the exemplary embodiment of the present invention, in case the transmitting STA fails to receive the block ACK frame, a method performed by the transmitting STA for determining whether a non-reception cause of the block ACK frame corresponds to a transmission failure of the data frame by the transmitting STA or whether a non-reception cause of the block ACK frame corresponds to a transmission failure of the block ACK frame by the receiving STA.

Figure 12:
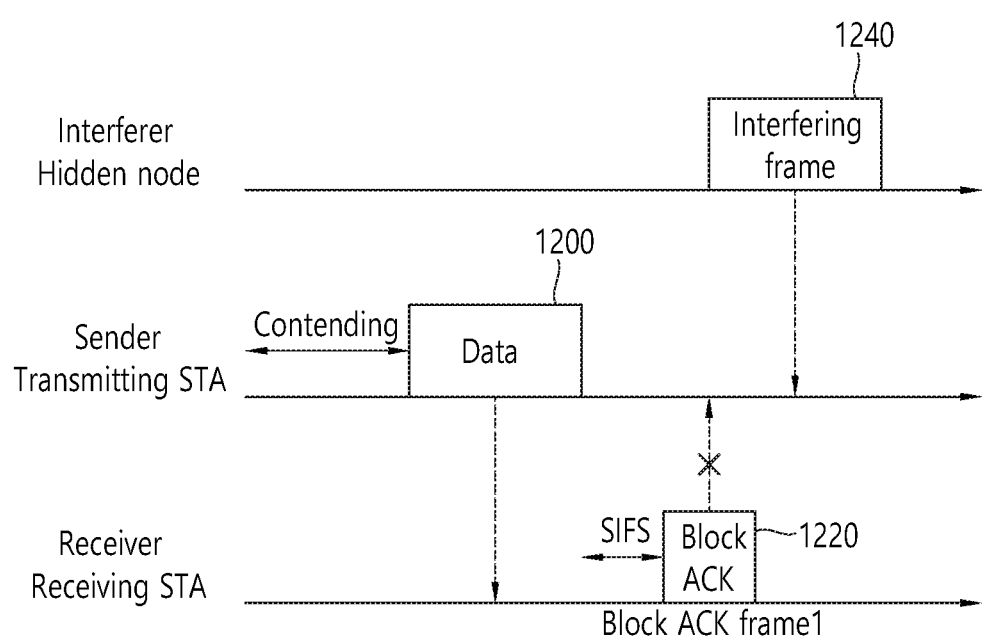
FIG. 12 is a conceptual view illustrating a transmission failure of a block ACK frame by a receiving STA according to an exemplary embodiment of the present invention.

FIG. 12 is a conceptual view illustrating a transmission failure of a block ACK frame by a receiving STA according to an exemplary embodiment of the present invention.

A block ACK frame may be modulated and coded so as to be more robust against errors than a data frame. The transmission failure of the block ACK frame by the receiving STA does not occur due to a channel status but may generally occur due to a collision with another frame, which is transmitted by a hidden node (or a hidden terminal).

Referring to FIG. 12, a hidden node may transmit a frame (hereinafter referred to as an interference frame) 1240 to the transmitting STA, and, in case a transmission timing of the interference frame overlaps with a transmission timing of the block ACK frame 1120, an inter-frame collision may occur.

The hidden node may determine that a medium is idle after the transmission of a data frame 1200 by the transmitting STA and may transmit the interference frame 1240 to the transmitting STA through the medium. In this case, a collision may occur between the interference frame 1240, which is transmitted by the hidden node, and the block ACK frame 1220, which is transmitted by the receiving STA. And, accordingly, the transmitting STA cannot receive the block ACK frame 1220.

A time period for the transmission of the interference frame 1240 by the hidden node may overlap with only a portion (or part) of a time period for the transmission of the block ACK frame 1220 by the receiving STA. In this case, the transmitting STA may successfully perform decoding on a part of a data unit included in the block ACK frame 1220.

For example, the transmitting STA may successfully perform decoding of a PPDU header (e.g., PHY preamble) of a PPDU carrying the block ACK frame 1220 and may fail to perform decoding on the remaining MAC payload. L-SIG being included in the PPDU header may include information on a transmission duration of the block ACK frame 1220. A transmission duration of a frame may be determined based on length information and data rate information, which are included in the L-SIG.

The transmitting STA may determine whether or not a transmission failure of the block ACK frame 1220 has occurred due to a collision between the interference frame 1240, which is transmitted by the hidden node, and the block ACK frame 1220 of the receiving STA by using information on the transmission duration of the block ACK frame 1220, which is acquired based on the L-SIG.

For example, in case the medium is discovered to be continuously busy even after the duration of the block ACK frame 1220, the transmitting STA may assume that a transmission performed by a medium of another frame exists. Accordingly, the transmitting STA may determine that a transmission failure of the block ACK frame 1220 by the receiving STA has occurred due to a collision between the block ACK frame 1220 and another interference frame 1240. More specifically, the transmitting STA may determine the non-reception cause of the block ACK frame 1220 as a transmission failure of the block ACK frame 1220 by the receiving STA.

As another example, the transmitting STA may also fail to receive the PPDU header of the PPDU carrying the block ACK frame 1220. The transmitting STA, which has failed to receive the PPDU header, may transmit a data frame 1200, and, after a SIFS, the transmitting STA may determine whether or not a specific wireless signal is being transmitted through the medium (or whether or not the medium is busy). Additionally, the transmitting STA may determine whether or not the medium is busy during a predetermined period of time after an SIFS since the transmission of a data frame 1200 by the transmitting STA that has failed to receive the PPDU header. The predetermined period of time may be determined based on a transmission duration of a general block ACK frame. In case the medium is busy during a predetermined period of time after an SIFS since the transmission of the data frame 1200 by the transmitting STA, the transmitting STA may determine the non-reception cause of the block ACK frame 1220 as the transmission failure of the block ACK frame 1220 by the receiving STA. Based on the above-described determined result, the transmitting STA may determine that the transmission failure of the block ACK frame 1220 by the receiving STA has occurred due to a collision between the block ACK frame 1220 and the interference frame 1240.

As another example, the transmission failure of the block ACK frame 1220 by the receiving STA may also occur due to the channel status. In case an MCS for the block ACK frame 1220 is incorrectly selected, the transmission failure of the block ACK frame 1220 by the receiving STA may occur due to channel interference. A PPDU header of a PPDU carrying the block ACK frame 1220 may be more robust against errors than other parts (e.g., MAC payload) of the PPDU. Therefore, in case the reception of PPDU header of the PPDU is successful and the reception of the remaining part of the PPDU is failed, the transmitting STA may also determine that a transmission failure of the block ACK frame 1220 by the receiving STA has occurred.

Additionally, according to the exemplary embodiment of the present invention, in the step of decoding the PPDU header (e.g., preamble) of the PPDU carrying the block ACK frame 1220, based on BBS color information included in the PPDU header, the STA may determine the non-reception cause of the block ACK frame 1220 by the transmitting STA. The BSS color information may include BSS identification information of the BSS, which includes the STA that has transmitted the PPDU. The BSS color information may be included in a signal field (e.g., HE-SIG A), which is included in the PPDU header of the PPDU carrying the block ACK frame 1220.

More specifically, based on the BSS color information of the receiving PPDU, the transmitting STA may determine whether or not the block ACK frame 1220 is transmitted as a response to the data frame 1200, which is transmitted by the transmitting STA. For example, the transmitting STA may determine whether or not the BSS color information of the receiving PPDU indicates identification information of the BSS including the transmitting STA.

In case the BSS color information being included in the PPDU header of the received PPDU indicates identification information of the BSS including the transmitting STA, and in case the decoding on the remaining part of the receiving PPDU is failed, the transmitting STA may determine that a transmission failure of the block ACK frame 1220 by the receiving STA has occurred.

Conversely, in case the BSS color information being included in the PPDU header of the received PPDU does not indicate identification information of the BSS including the transmitting STA, and in case the decoding on the remaining part of the receiving PPDU is failed, the transmitting STA may determine that a transmission failure of the data frame 1200 by the transmitting STA has occurred.

Figure 13:
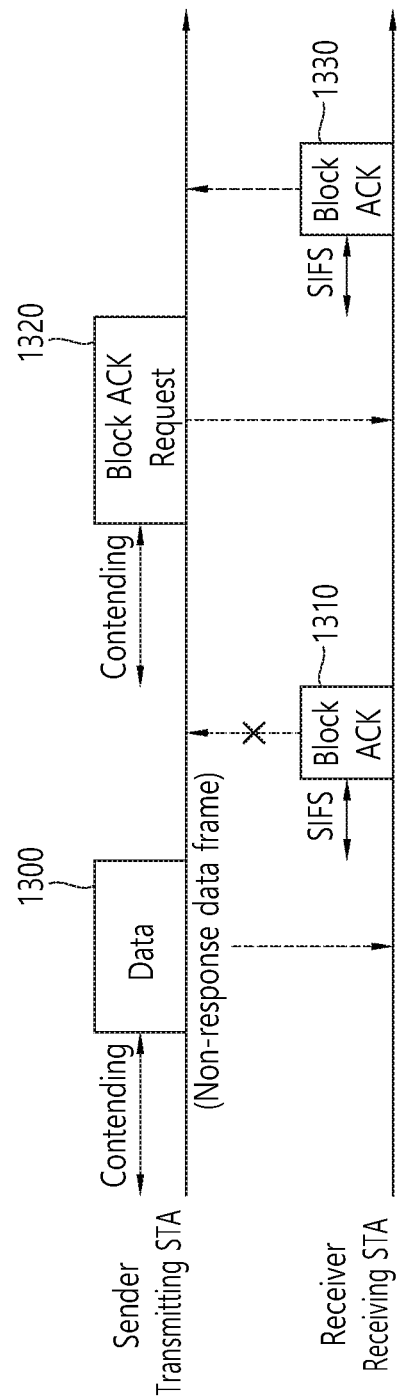
FIG. 13 is a conceptual view illustrating an error recovery procedure according to an exemplary embodiment of the present invention.

FIG. 13 is a conceptual view illustrating an error recovery procedure according to an exemplary embodiment of the present invention.

FIG. 13 discloses operations of the transmitting STA in a case when additional data frames that are to be additionally transmitted to the STA do not exist after the transmission of a non-response data frame by the transmitting STA.

Referring to FIG. 13, the transmitting STA may determine a non-reception cause of a block ACK frame 1310 as a transmission failure of the block ACK frame 1310 by the receiving STA. In case pending data that are to be transmitted to the receiving STA do not exist (or in case additional data frames that are to be additionally transmitted to the receiving STA do not exist), the transmitting STA may request block ACK information corresponding to a non-response data frame 1300 to the receiving STA based on a block ACK request frame 1320.

The block ACK request frame 1320 may include information indicating a request for block ACK information corresponding to the non-response data frame 1300 (e.g., information indicating data units being included in the non-response data frame).

The receiving STA may transmit a block ACK frame 1330 to the transmitting STA as a response to the block ACK request frame 1320. The block ACK frame 1330 may include block ACK information corresponding to the non-response data frame 1300.

As another example, the block ACK request frame 1320 may include the above-described PBAR information, and the block ACK frame 1330 may include the above-described PBA information.

According to another exemplary embodiment of the present invention, even in case pending data that are to be additionally transmitted to the receiving STA do not exist after the transmission of the non-response data frame 1300, the transmitting STA may perform transmission by using the same format as the PBAR data frame. In this case, the PBAR data frame may not include data units that are to be additionally transmitted to the receiving STA. The receiving STA may transmit a PBAR block ACK frame to the transmitting STA as a response to the PBAR data frame. In this case, the PBAR block ACK frame may only include block ACK information corresponding to the non-response block ACK frame.

Figure 14:
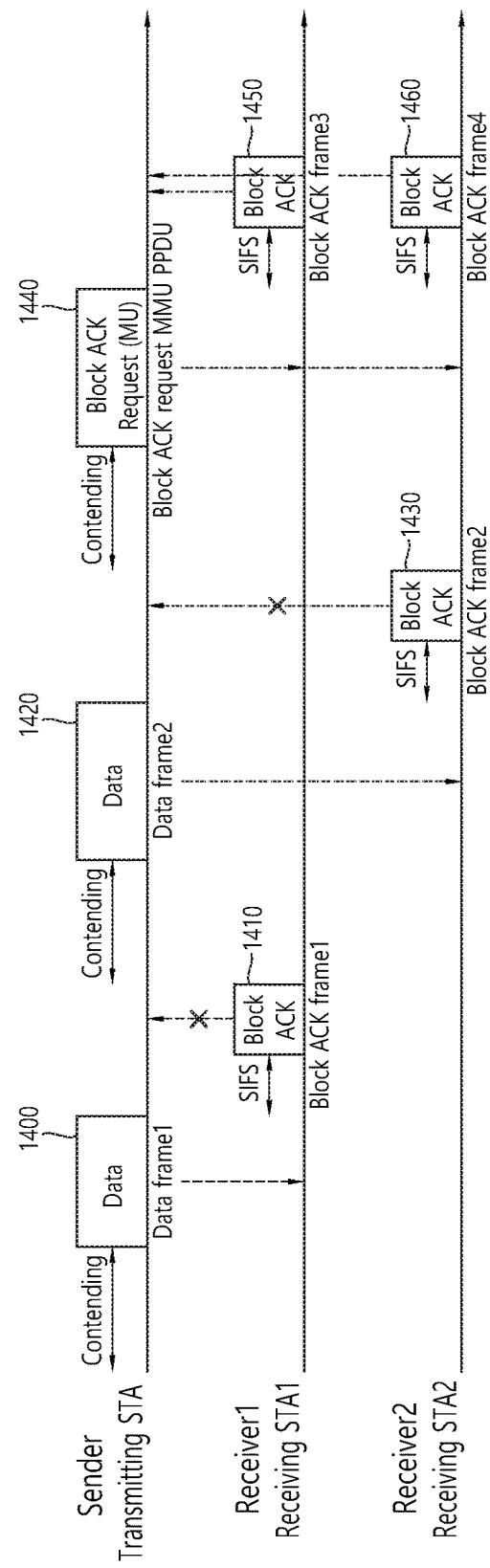
FIG. 14 is a conceptual view illustrating an error recovery procedure that is based on MU transmission according to an exemplary embodiment of the present invention

FIG. 14 is a conceptual view illustrating an error recovery procedure that is based on MU transmission according to an exemplary embodiment of the present invention FIG. 14 discloses a method performed by the transmitting STA for transmitting a block ACK request frame to a plurality of receiving STAs based on MU transmission and a method performed by a plurality of receiving STAs for respectively transmitting a plurality of block ACK frames based on MU transmission. In FIG. 14, it is assumed that the transmitting STA corresponds to an AP STA and that the receiving STA corresponds to a non-AP STA.

Referring to FIG. 14, the transmitting STA may transmit data frame1 1400 to the receiving STA. The receiving STA may transmit block ACK frame1 1410 to the transmitting STA as a response to the data frame1 1400. The transmitting STA fails to receive the block ACK frame1 1410, and the transmitting STA may determine the non-reception cause of the block ACK frame1 1410 as a transmission failure of the block ACK frame1 1410 by the receiving STA.

Similarly, the transmitting STA may transmit data frame2 1420 to receiving STA2. The receiving STA2 may transmit block ACK frame2 1430 to the transmitting STA as a response to the data frame2 1420. The transmitting STA may fail to receive the block ACK frame2 1430, and the transmitting STA may determine the non-reception cause of the block ACK frame2 1430 as a transmission failure of the block ACK frame2 1430 by the receiving STA.

The transmitting STA may respectively determine the non-reception causes of the block ACK frame1 1410 and the block ACK frame2 1430 as the transmission failure of the block ACK frame1 1410 by the receiving STA1 and as the transmission failure of the block ACK frame2 1430 by the receiving STA2, and, after the transmission of the non-response data frames, the transmitting STA may not have any pending downlink data that are to be respectively transmitted to the receiving STA1 and the receiving STA2 (or data frames that are to be respectively transmitted to the receiving STA1 and the receiving STA2). In this case, the transmitting STA may respectively transmit a plurality of block ACK request frames to the receiving STA1 and the receiving STA2 based on DL MU transmission, and each of the receiving STA1 and the receiving STA2 may transmit a plurality of block ACK frames to the transmitting STA based on DL MU transmission.

The transmitting STA may respectively transmit a plurality of block ACK request frames to the receiving STA1 and the receiving STA2 based on diverse DL MU transmission methods. More specifically, the transmitting STA may transmit block ACK request frame1 to the receiving STA1 through sub-channel1 and may transmit block ACK request frame2 to the receiving STA2 through sub-channel2 based on a DL MU PPDU format (hereinafter referred to as a block ACK request MU PPDU) 1440 including the block ACK request frame1 and the block ACK request frame2. As another example, the transmitting STA may transmit block ACK request frame1 to the receiving STA1 through time-spatial stream1 of the sub-channel1 and may transmit block ACK request frame2 to the receiving STA2 through time-spatial stream2 of the sub-channel2 based on the block ACK request MU PPDU 1440 including the block ACK request frame1 and the block ACK request frame2.

The block ACK request MU PPDU 1440 carrying the block ACK request frame1 and the block ACK request frame2, which are transmitted by the transmitting STA based on DL MU transmission, may include information for the UL MU transmission of the block ACK frame1 and the block ACK frame2.

For example, the block ACK request MU PPDU 1440 may include resource allocation information for the UL MU transmission corresponding to each of the plurality of receiving STAs (e.g., receiving STA1 and receiving STA2), identification information of each of the plurality of receiving STAs, information on a modulation and coding scheme (MCS) being applied to each of the plurality of block ACK frames, which are transmitted by each of the plurality of receiving STAs, information on the UL MU type (OFDMA, MIMO) of the block ACK frames being transmitted by each of the plurality of receiving STAs, and so on. Additionally, the block ACK request MU PPDU 1440 may further include information on a transmission power of the block ACK frame, and information on space time block coding (STBC) and beamforming that are to be used for the transmission of the block ACK frame.

The receiving STA1 and the receiving STA2, which have received the block ACK request MU PPDU 1440 including the above-described information, may respectively transmit the block ACK frame1 and the block ACK frame2 to the transmitting STA within an overlapped time resource through transmission resources that are allocated based on the UL MU transmission. For example, in case the sub-channel1 is allocated to the receiving STA1 and the sub-channel 2 is allocated to the receiving STA2 based on the block ACK request MU PPDU 1440 being transmitted by the transmitting STA, the receiving STA1 may transmit a block ACK frame3 1450 through the sub-channel1 based on the UL MU transmission, and the receiving STA2 may transmit a block ACK frame4 1460 through the sub-channel2 based on the UL MU transmission.

Each of the receiving STA1 and the receiving STA2, which have received the block ACK request MU PPDU 1440, may transmit a block ACK frame to the transmitting STA based on a short interframe space (SIFS), which corresponds to an interval (or space) between frames (or inter-frame interval). For example, each of the receiving STA1 and the receiving STA2, which have received a block ACK request frame, may receive the block ACK request MU PPDU 1440, and, after a SIFS, each of the receiving STA1 and the receiving STA2 may transmit a block ACK frame to the transmitting STA.

Figure 15:
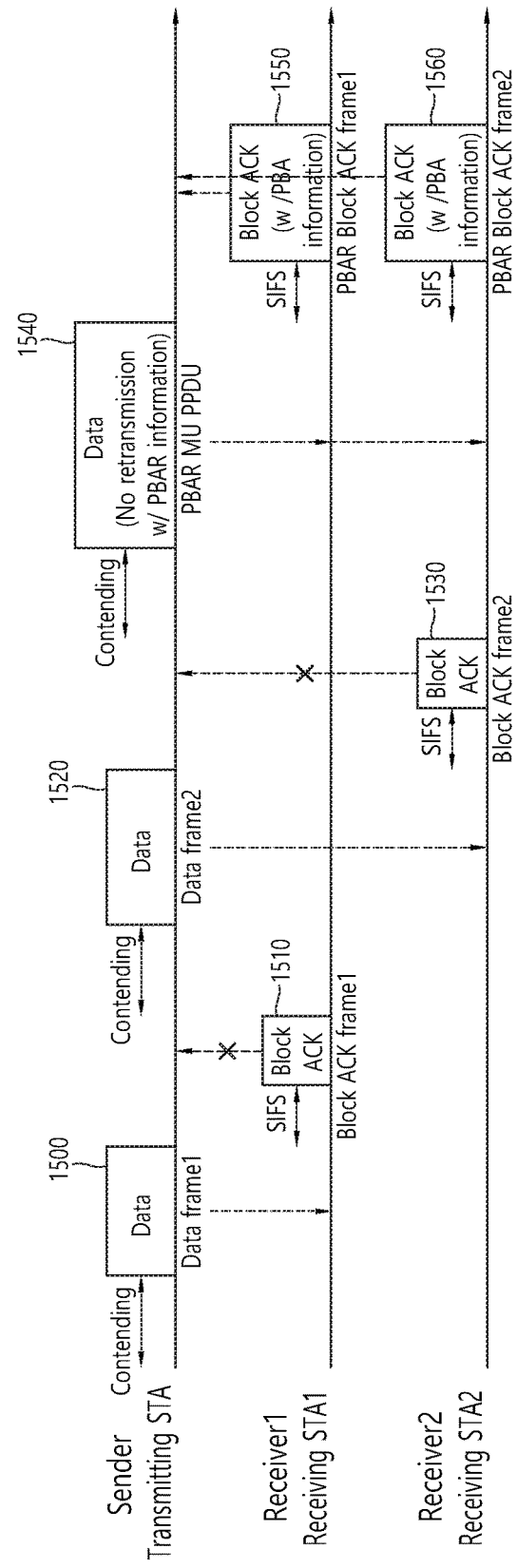
FIG. 15 is a conceptual view illustrating an error recovery procedure that is based on MU transmission according to an exemplary embodiment of the present invention.

FIG. 15 is a conceptual view illustrating an error recovery procedure that is based on MU transmission according to an exemplary embodiment of the present invention.

FIG. 15 discloses a method performed by the transmitting STA for transmitting a PBAR data frame to a plurality of receiving STAs based on MU transmission and a method performed by a plurality of receiving STAs for respectively transmitting a plurality of block ACK frames based on MU transmission. In FIG. 15, it is assumed that the transmitting STA corresponds to an AP STA and that the receiving STA corresponds to a non-AP STA.

Referring to FIG. 15, the transmitting STA may transmit data frame1 1500 to the receiving STA. The receiving STA may transmit block ACK frame1 1510 to the transmitting STA as a response to the data frame1 1500. The transmitting STA fails to receive the block ACK frame1 1510, and the transmitting STA may determine the non-reception cause of the block ACK frame1 1510 as a transmission failure of the block ACK frame1 1510 by the receiving STA.

Similarly, the transmitting STA may transmit data frame2 1520 to receiving STA2. The receiving STA2 may transmit block ACK frame2 1530 to the transmitting STA as a response to the data frame2 1520. The transmitting STA may fail to receive the block ACK frame2 1530, and the transmitting STA may determine the non-reception cause of the block ACK frame2 1530 as a transmission failure of the block ACK frame2 1530 by the receiving STA.

The transmitting STA may respectively determine the non-reception causes of the block ACK frame1 1510 and the block ACK frame2 1530, which are respectively transmitted by the receiving STA1 and the receiving STA2, as the transmission failure of the block ACK frame1 1510 by the receiving STA1 and as the transmission failure of the block ACK frame2 1530 by the receiving STA2, and, after the transmission of the non-response data frames (data frame1 1500, data frame2 1520), the transmitting STA may have downlink data pending to each of the receiving STA1 and the receiving STA2 that are to be transmitted (or data frames that are to be respectively transmitted to the receiving STA1 and the receiving STA2). In this case, the transmitting STA may transmit a plurality of PBAR data frames 1540 to the receiving STA1 and the receiving STA2 based on the DL MU transmission.

The transmitting STA may respectively transmit a plurality of PBAR data frames to the receiving STA1 and the receiving STA2 based on diverse DL MU transmission methods. More specifically, the transmitting STA may transmit a DL MU PPDU format (hereinafter referred to as PBAR MU PPDU) 1540, which includes a PBAR data frame 1 including PBAR information1 and data pending to STA1, and a PBAR data frame2 including PBAR information2 and data pending to STA2.

Based on the PBAR MU PPDU 1540, the transmitting STA may transmit the PBAR data frame1 to the receiving STA1 through sub-channel1 and may transmit the PBAR data frame2 to the receiving STA2 through sub-channel2. As another example, based on the PBAR MU PPDU 1540, the transmitting STA may transmit the PBAR data frame1 to the receiving STA1 through time-spatial stream1 within the sub-channel1 and may transmit PBAR data frame2 to the receiving STA2 through time-spatial stream2 within the sub-channel2.

The PBAR MU PPDU 1540 may include information for the transmission of the PBAR block ACK frame1 and the PBAR block ACK frame2.

For example, the PBAR MU PPDU 1540 may include resource allocation information for the UL MU transmission corresponding to each of the plurality of receiving STAs (e.g., receiving STA1 and receiving STA2), identification information of each of the plurality of receiving STAs, information on a MCS being applied to each of the plurality of PBAR block ACK frames, which are transmitted by each of the plurality of receiving STAs, information on the UL MU type (OFDMA, MIMO) of the PBAR block ACK frames being transmitted by each of the plurality of receiving STAs, and so on. Additionally, the PBAR MU PPDU 1540 may further include information on a transmission power of the PBAR block ACK frame, and information on STBC and beamforming that are to be used for the transmission of the PBAR block ACK frame.

The receiving STA1 and the receiving STA2, which have received the PBAR MU PPDU 1540 including the above-described information, may respectively transmit the PBAR block ACK frame1 and the PBAR block ACK frame2 to the transmitting STA within an overlapped time resource through the allocated transmission resources. For example, in case the sub-channel1 is allocated to the receiving STA1 and the sub-channel 2 is allocated to the receiving STA2 based on the PBAR MU PPDU 1540 being transmitted by the transmitting STA, the receiving STA1 may transmit a PBAR block ACK frame1 1550 through the sub-channel1, and the receiving STA2 may transmit a PBAR block ACK frame2 1560 through the sub-channel2.

Each of the receiving STA1 and the receiving STA2, which have received the PBAR MU PPDU 1540, may respectively transmit PBAR block ACK frame1 1550 and PBAR block ACK frame2 1560 to the transmitting STA based on a SIFS, which corresponds to an interval (or space) between frames (or inter-frame interval). For example, each of the receiving STA1 and the receiving STA2, which have received a PBAR MU PPDU 1540, and may transmit PBAR block ACK frames 1550 and 1560 to the transmitting STA after a SIFS since the reception of the PBAR MU PPDU 1540.

Figure 16:
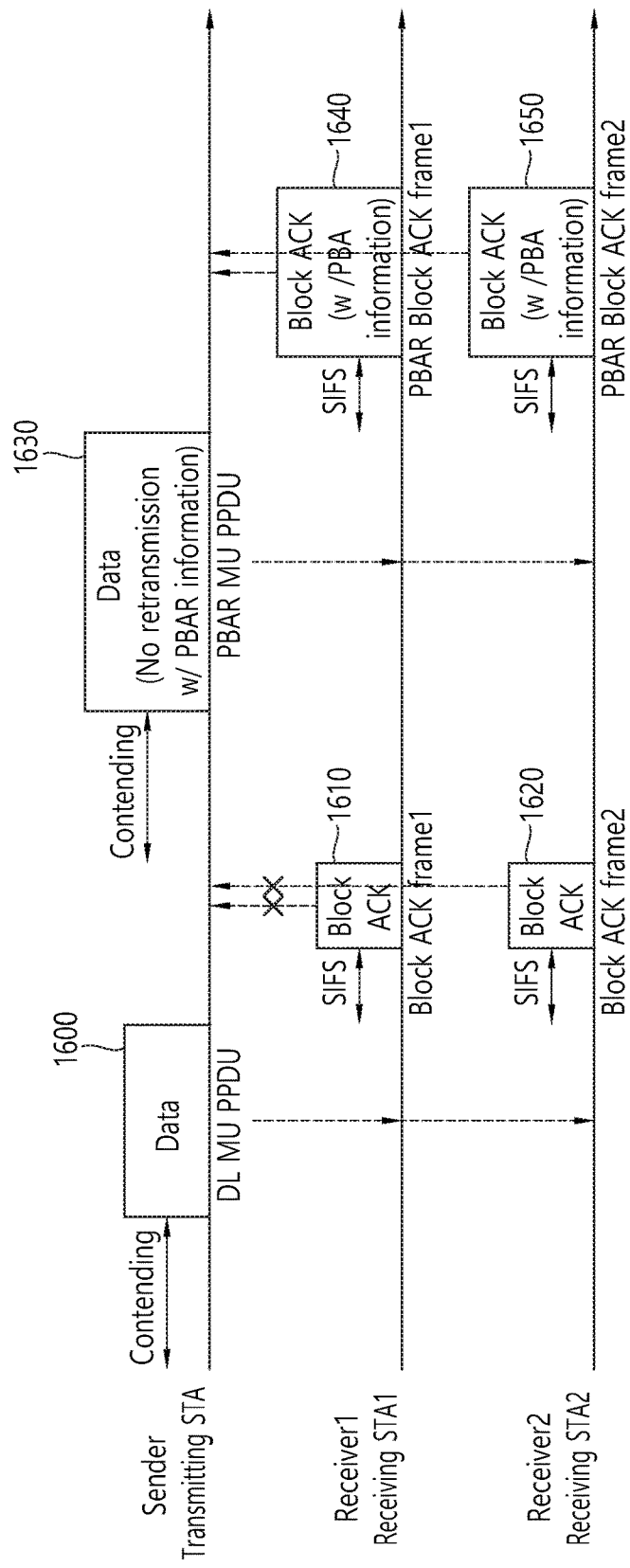
FIG. 16 is a conceptual view illustrating an error recovery procedure that is based on MU transmission according to an exemplary embodiment of the present invention.

FIG. 16 is a conceptual view illustrating an error recovery procedure that is based on MU transmission according to an exemplary embodiment of the present invention.

FIG. 16 discloses a method performed by the transmitting STA for transmitting a data frame and a PBAR data frame to a plurality of receiving STAs based on MU transmission and a method performed by a plurality of receiving STAs for respectively transmitting a plurality of block ACK frames and a plurality of PBAR block ACK frames based on MU transmission. In FIG. 16, it is assumed that the transmitting STA corresponds to an AP STA and that the receiving STA corresponds to a non-AP STA.

Referring to FIG. 16, the transmitting STA may transmit a DL MU PPDU 1600, which includes a plurality of data frames, to a plurality of receiving STAs.

More specifically, the DL MU PPDU 1600, which is to be transmitted to the receiving STA1 by the transmitting STA, may include a data frame1 for the receiving STA1 and a data frame2 for the receiving STA2. The DL MU PPDU 1600 may include information (e.g., information on resource allocation, identification information of the receiving STA, and so on) for the transmission of a block ACK frame1 1610 and a block ACK frame2 1620.

Within an overlapped time resource, based on MU transmission, the receiving STA1 may transmit the block ACK frame1 1610 through the allocated resource, and the receiving STA2 may transmit the block ACK frame2 1620 through the allocated resource. The transmitting STA may not receive the block ACK frame1 1610 transmitted by STA1 and the block ACK frame2 1620 transmitted by the STA2. The transmitting STA may respectively determine non-reception causes of the block ACK frame1 1610 and the block ACK frame2 1620 as a transmission failure of the block ACK frame1 1610 by the receiving STA1 and as a transmission failure of the block ACK frame2 1620 by the receiving STA2.

The transmitting STA may respectively determine the non-reception causes of the block ACK frame1 1610 and the block ACK frame2 1620, which are respectively transmitted by the receiving STA1 and the receiving STA2, as a transmission failure of the block ACK frame1 1610 by the receiving STA1 and as a transmission failure of the block ACK frame2 1620 by the receiving STA2, and, then, the transmitting STA may have downlink data pending to each of the receiving STA1 and the receiving STA2 that are to be transmitted after the transmission of the non-response data frames (data frame1, data frame2) (or data frames that are to be transmitted to each of the receiving STA1 and the receiving STA2). In this case, the transmitting STA may transmit a plurality of PBAR data frames to the receiving STA1 and the receiving STA2 based on DL MU transmission.

The transmitting STA may respectively transmit a plurality of PBAR data frames to the receiving STA1 and the receiving STA2 based on diverse DL MU transmission methods. More specifically, the transmitting STA may transmit a DL MU PPDU format (hereinafter referred to as PBAR MU PPDU) 1630, which includes a PBAR data frame1 including PBAR information1 and data pending to STA1, and a PBAR data frame2 including PBAR information2 and data pending to STA2.

For example, based on the PBAR MU PPDU 1630, the transmitting STA may transmit the PBAR data frame1 to the receiving STA1 through sub-channel1 and may transmit the PBAR data frame2 to the receiving STA2 through sub-channel2. As another example, based on the PBAR MU PPDU 1630, the transmitting STA may transmit the PBAR data frame1 to the receiving STA1 through time-spatial stream1 within the sub-channel1 and may transmit PBAR data frame2 to the receiving STA2 through time-spatial stream2 within the sub-channel2.

The PBAR MU PPDU 1630 may include information for triggering the transmission of the PBAR block ACK frame1 and the PBAR block ACK frame2.

For example, the PBAR MU PPDU 1630 may include resource allocation information for the UL MU transmission corresponding to each of the plurality of receiving STAs (e.g., receiving STA1 and receiving STA2), identification information of each of the plurality of receiving STAs, information on a MCS being applied to each of the plurality of PBAR block ACK frames 1640 and 1650, which are transmitted by each of the plurality of receiving STAs, information on the MU type (OFDMA, MIMO) of the PBAR block ACK frames 1640 and 1650 being transmitted by each of the plurality of receiving STAs, and so on. Additionally, the PBAR MU PPDU 1630 may further include information on a transmission power of the PBAR block ACK frames 1640 and 1650, and information on STBC and beamforming that are to be used for the transmission of the PBAR block ACK frames 1640 and 1650.

The receiving STA1 and the receiving STA2, which have received the PBAR MU PPDU 1630 including the above-described information, may respectively transmit the PBAR block ACK frame1 1640 and the PBAR block ACK frame2 1650 to the transmitting STA within an overlapped time resource through the allocated transmission resources. For example, in case the sub-channel1 is allocated to the receiving STA1 and the sub-channel 2 is allocated to the receiving STA2 based on the PBAR MU PPDU 1630 being transmitted by the transmitting STA, the receiving STA1 may transmit a PBAR block ACK frame1 1640 through the sub-channel1, and the receiving STA2 may transmit a PBAR block ACK frame2 1650 through the sub-channel2.

Each of the receiving STA1 and the receiving STA2, which have received the PBAR MU PPDU 1630, may respectively transmit PBAR block ACK frame1 1640 and PBAR block ACK frame2 1650 to the transmitting STA based on a SIFS, which corresponds to an interval (or space) between frames (or inter-frame interval). For example, each of the receiving STA1 and the receiving STA2, which have received a PBAR MU PPDU 1630, and may transmit PBAR block ACK frames 1640 and 1650 to the transmitting STA after a SIFS since the reception of the PBAR MU PPDU 1630.

Figure 17:
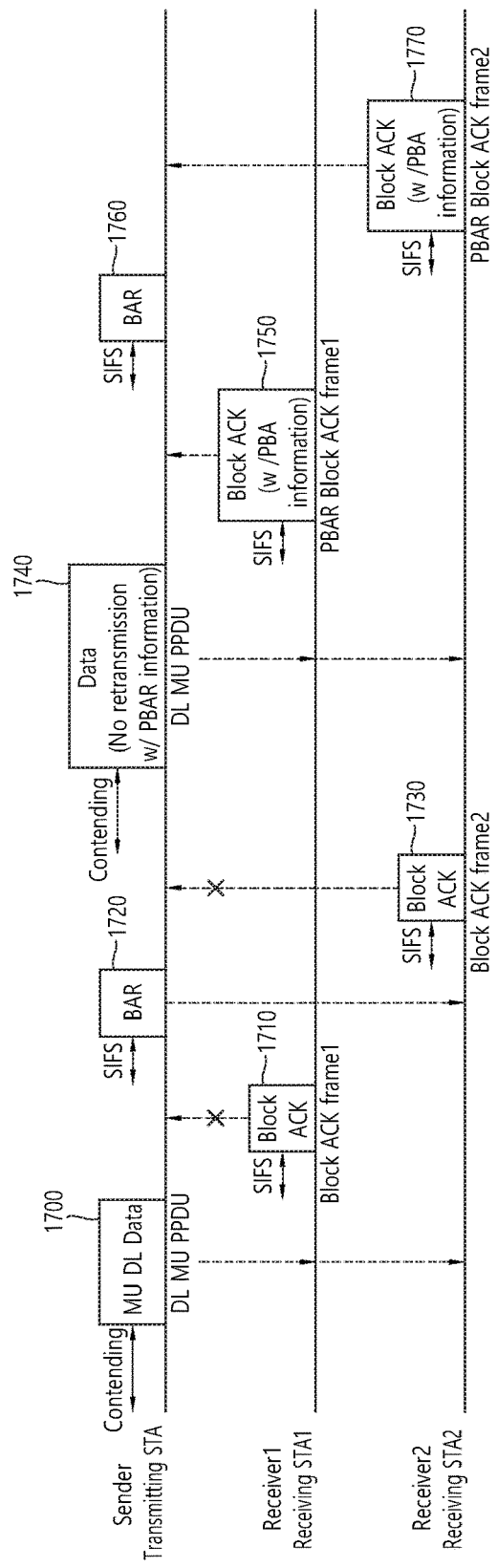
FIG. 17 is a conceptual view illustrating an error recovery procedure that is based on MU transmission according to an exemplary embodiment of the present invention.

FIG. 17 is a conceptual view illustrating an error recovery procedure that is based on MU transmission according to an exemplary embodiment of the present invention.

FIG. 17 discloses a method performed by the transmitting STA for transmitting a data frame and a PBAR data frame to a plurality of receiving STAs based on MU transmission and a method performed by a plurality of receiving STAs for respectively transmitting a plurality of block ACK frames and a plurality of PBAR block ACK frames based on SU transmission. In FIG. 17, it is assumed that the transmitting STA corresponds to an AP STA and that the receiving STA corresponds to a non-AP STA.

Referring to FIG. 17, the transmitting STA may transmit a DL MU PPDU 1700, which includes a plurality of data frames, to a plurality of receiving STAs.

More specifically, the DL MU PPDU 1700, which is to be transmitted to the receiving STA1 by the transmitting STA, may include a data frame1 for the receiving STA1 and a data frame2 for the receiving STA2.

Each of the receiving STA1 and the receiving STA2 may sequentially transmit block ACK frames corresponding to the data frame1 and the data frame2, which are transmitted based on DL MU transmission. Each of the receiving STA1 and the receiving STA2 may immediately determine whether or not it corresponds to an STA that is to transmit the block ACK frame after the transmission of the DL MU PPDU based on the information included in the DL MU PPDU 1700.

For example, an STA that is most initially indicated in the identification information corresponding to the plurality of receiving STAs that are to receive the DL MU PPDU 1700, the identification information being included in the PPDU header of the DL MU PPDU 1700, may transmit a block ACK frame based on an SIFS after receiving the DL MU PPDU 1700. The remaining STAs may receive the BAR frame of the transmitting STA and may transmit a block ACK frame to the transmitting STA s a response to the received BAR frame. This method is merely an exemplary method, and, therefore, a receiving STA that is to transmit a block ACK frame immediately after the transmission of the DL MU PPDU 1700 and a receiving STA that is to transmit a block ACK frame as a response to the BAR frame may be determined based on diverse methods.

In case the identification information corresponding to the plurality of receiving STAs that are to receive the DL MU PPDU 1700, the identification information being included in the PPDU header of the DL MU PPDU 1700, initially indicates the receiving STA1, the receiving STA1 may transmit a block ACK frame1 1710 to the transmitting STA based on an SIFS after receiving the DL MU PPDU 1700.

In case the identification information corresponding to the plurality of receiving STAs that are to receive the DL MU PPDU 1700, the identification information being included in the PPDU header of the DL MU PPDU 1700, indicates the receiving STA2 after indicating the receiving STA1, the receiving STA2 may receive a BAR frame 1720, which is transmitted by the transmitting STA, and may then transmit a block ACK frame2 1730 as a response to the BAR frame 1720.

The transmitting STA may not receive the block ACK frame1 1710 transmitted by STA1 and the block ACK frame2 1720 transmitted by the STA2. The transmitting STA may respectively determine non-reception causes of the block ACK frame1 1710 and the block ACK frame2 1720 as a transmission failure of the block ACK frame1 1710 by the receiving STA1 and as a transmission failure of the block ACK frame2 1720 by the receiving STA2.

The transmitting STA may respectively determine the non-reception causes of the block ACK frame1 1710 and the block ACK frame2 1720 as a transmission failure of the block ACK frame1 1710 by the receiving STA1 and as a transmission failure of the block ACK frame2 1720 by the receiving STA2, and, then, the transmitting STA may have downlink data pending to each of the receiving STA1 and the receiving STA2 that are to be transmitted after the transmission of the non-response data frames (data frame1, data frame2) (or data frames that are to be transmitted to each of the receiving STA1 and the receiving STA2). In this case, the transmitting STA may transmit a plurality of PBAR data frames to the receiving STA1 and the receiving STA2 based on DL MU transmission.

The transmitting STA may respectively transmit a plurality of PBAR data frames to the receiving STA1 and the receiving STA2 based on diverse DL MU transmission methods. More specifically, the transmitting STA may transmit a DL MU PPDU format (hereinafter referred to as PBAR MU PPDU) 1740, which includes a PBAR data frame1 including PBAR information1 and data pending to STA1, and a PBAR data frame2 including PBAR information2 and data pending to STA2.

For example, based on the PBAR MU PPDU 1740, the transmitting STA may transmit the PBAR data frame1 to the receiving STA1 through sub-channel1 and may transmit the PBAR data frame2 to the receiving STA2 through sub-channel2. As another example, based on the PBAR MU PPDU 1740, the transmitting STA may transmit the PBAR data frame1 to the receiving STA1 through time-spatial stream1 within the sub-channel1 and may transmit PBAR data frame2 to the receiving STA2 through time-spatial stream2 within the sub-channel2.

Each of the receiving STA1 and the receiving STA2 may determine whether or not it corresponds to an STA that is to transmit a block ACK frame immediately after the transmission of the PBAR MU PPDU 1740 based on the information included in the PBAR MU PPDU 1740. A case when the receiving STA1 corresponds to the STA that is to immediately transmit the block ACK frame as a response to the PBAR MU PPDU 1740 is assumed herein.

The receiving STA1 may transmit a PBAR block ACK frame1 1750 based on an SIFS after receiving the PBAR MU PPDU 1740. The PBAR block ACK frame1 1750 may include block ACK information corresponding to a data frame1 and a PBAR data frame1.

The receiving STA2 may transmit a PBAR block ACK frame2 1770 based on an SIFS after receiving a BAR frame 1760, which is transmitted by the transmitting STA. The PBAR block ACK frame2 1770 may include block ACK information corresponding to the data frame2 and the PBAR data frame2.

Figure 18:
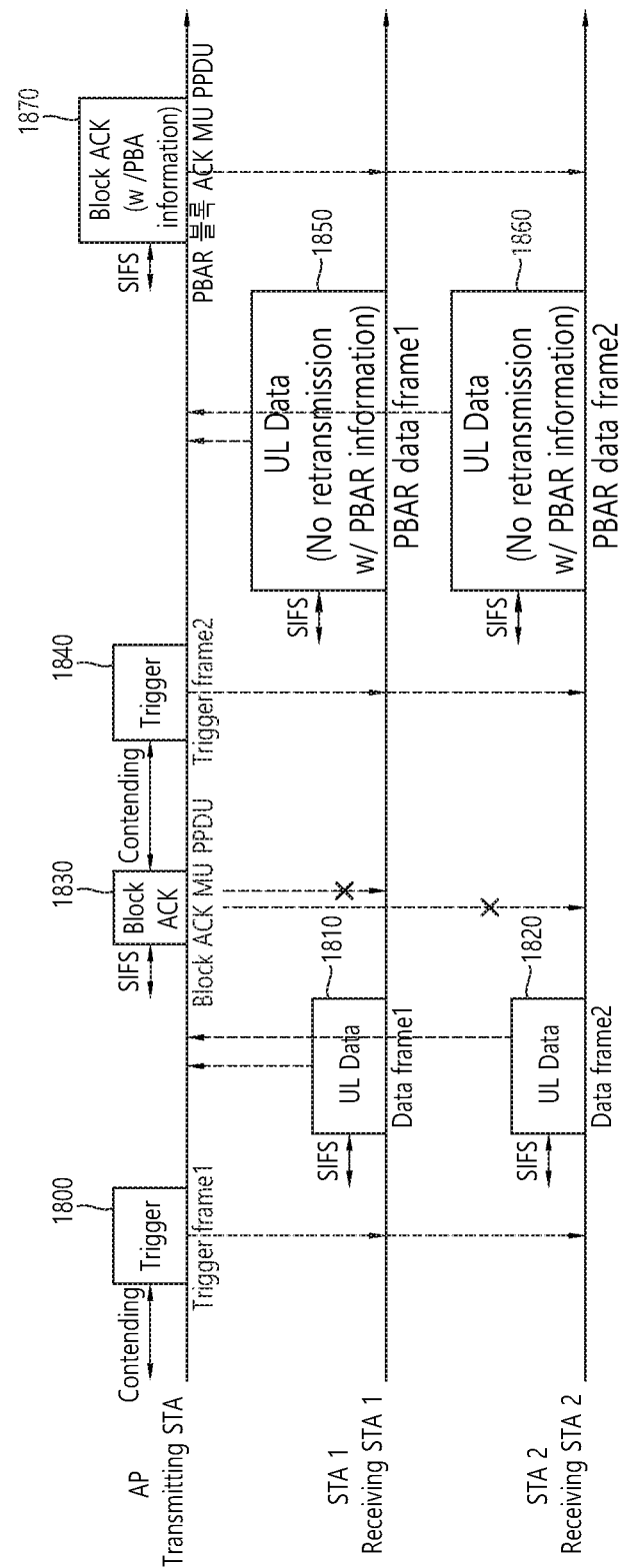
FIG. 18 is a conceptual view illustrating an error recovery procedure that is based on MU transmission according to an exemplary embodiment of the present invention.

FIG. 18 is a conceptual view illustrating an error recovery procedure that is based on MU transmission according to an exemplary embodiment of the present invention.

FIG. 18 discloses a method performed by a plurality of STAs for transmitting a plurality of data frames based on UL MU transmission and a method performed by the AP for transmitting a block ACK frame corresponding to a plurality of data frames. The plurality of STAs may correspond to transmitting STAs transmitting data frames, and the AP may correspond to a receiving STA transmitting a block ACK frame corresponding to the data frame.

Referring to FIG. 18, the AP may transmit a trigger frame1 1800 for triggering UL MU transmission performed by the plurality of STAs to the plurality of STAs.

For example, the trigger frame1 1800 may include resource allocation information for the transmission of uplink frames corresponding to each of the plurality of STAs (e.g., STA1, STA2), identification information of each of the plurality of STAs, information on a MCS being applied to each of the plurality of block ACK frames, which are transmitted by each of the plurality of STAs, information on the MU type (OFDMA, MIMO) of the block ACK frames being transmitted by each of the plurality of STAs, and so on. Additionally, the trigger frame1 1800 may further include information on a transmission power of the uplink frames of each STA, and information on STBC and beamforming that are to be used for the transmission of the uplink frames of each STA.

The STA1 may receive the trigger frame1 1800 and may transmit data frame1 through an allocated transmission resource (e.g., sub-channel1). Also, the STA2 may receive the trigger frame1 and may transmit data frame2 through an allocated transmission resource (e.g., sub-channel2). The data frame1 1810 and the data frame2 1820 may be transmitted through an overlapped time resource. The AP may receive the data frame1 1810 and the data frame2 1820, which are transmitted by the STA1 and STA2 via UL MU transmission.

The AP may transmit a block ACK MU PPDU 1830 including a block ACK frame1 corresponding to the data frame1 and a block ACK frame2 corresponding to the data frame2 based on DL MU transmission.

The STA1 and STA2 may fail to receive the block ACK MU PPDU 1830 and may determine the non-reception cause of the block ACK MU PPDU 1830 as the transmission failure of the ACK MU PPDU 1830 by the AP. In this case, each of the STA1 and STA2 may transmit a PBAR data frame to the AP and may request to the AP for block ACK information corresponding to the previously transmitted data frame1 1810 and data frame2 1820.

The AP may transmit a trigger frame2 1840 for triggering the transmission of additional uplink data to the STA1 and the STA2. The trigger frame2 1840 may also include information for the UL MU transmission of the STA1 and the STA2 just as the trigger frame1 1800.

The STA1 may transmit a PBAR data frame1 1850 as a response to the trigger frame2 1840, and the STA2 may transmit a PBAR data frame2 1860 as a response to the trigger frame2 1840. The PBAR data frame1 1850 and the PBAR data frame2 1860 may be transmitted through an overlapped time resource based on UL MU transmission. The AP may receive the PBAR data frame1 1850 and the PBAR data frame2 1860 based on a UL MU PPDU format.

The AP may receive the PBAR data frame1 1850 and the PBAR data frame2 1860, and, then, the AP may transmit a PBAR block ACK MU PPDU 1870 including PBAR block ACK frames corresponding to each of the STA1 and STA2 based on DL MU transmission.

The AP may transmit a PBAR block ACK MU PPDU 1870 including a PBAR block ACK frame1, which includes block ACK information corresponding to the data frame1 1810 and the PBAR data frame1 1850, and a PBAR block ACK frame2, which includes block ACK information corresponding to the data frame2 1820 and the PBAR data frame 1860, based on the MU transmission.

Figure 19:
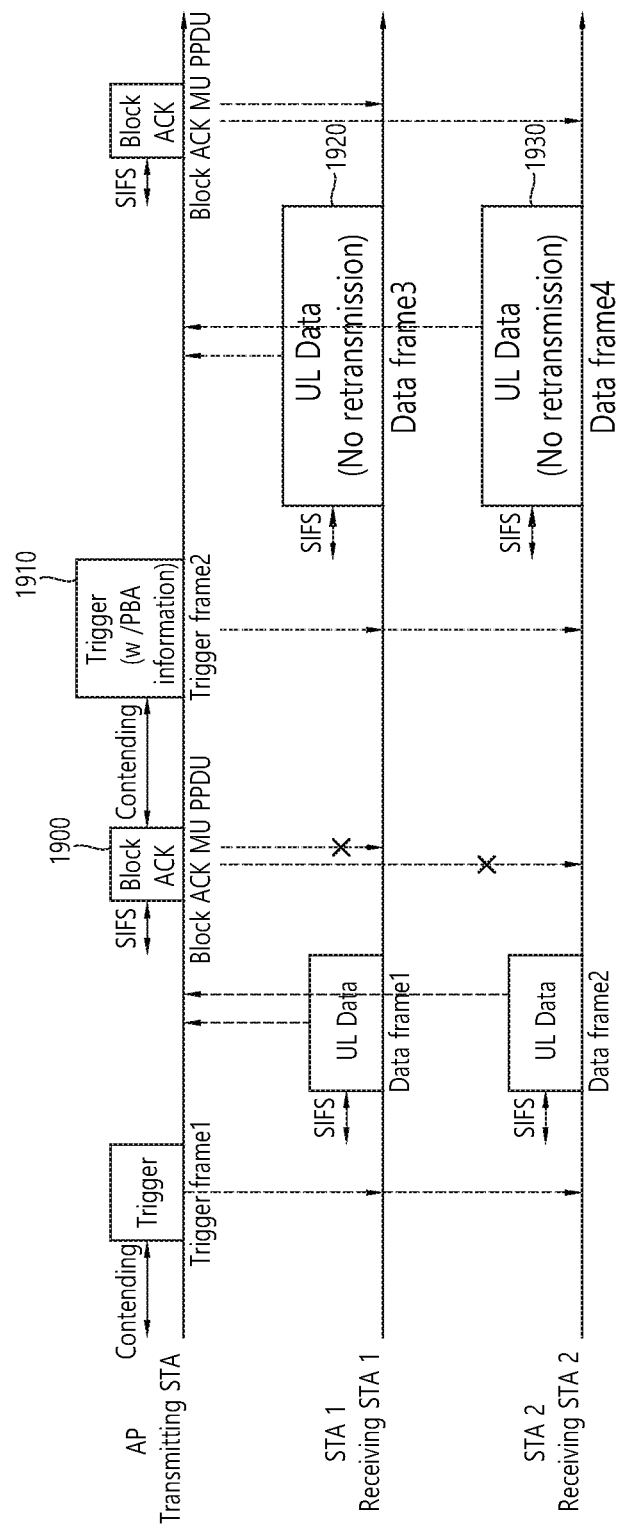
FIG. 19 is a conceptual view illustrating an error recovery procedure that is based on MU transmission according to an exemplary embodiment of the present invention.

FIG. 19 is a conceptual view illustrating an error recovery procedure that is based on MU transmission according to an exemplary embodiment of the present invention.

FIG. 19 discloses a method performed by a plurality of STAs for transmitting a plurality of data frames based on UL MU transmission and a method performed by the AP for transmitting a block ACK frame corresponding to a plurality of data frames. The plurality of STAs may correspond to transmitting STAs transmitting data frames, and the AP may correspond to a receiving STA transmitting a block ACK frame corresponding to the data frame. The procedure up to the step of transmitting a block ACK MU PPDU 1900 by the AP may be identical to FIG. 18.

Referring to FIG. 19, the AP may transmit a trigger frame2 1910 including PBA information.

In case the trigger frame2 1910 including PBA information is transmitted, the STA1 and the STA2 may re-receive block ACK information corresponding to the previously transmitted data frame1 and the data frame2.

In case the STA1 and the STA2 receive the block ACK information based on the trigger frame2 1910, instead of transmitting a PBAR data frame for requesting block ACK information corresponding to the data frame1 and the data frame2, the STA1 and the STA2 may transmit general data frames (data frame3 1920, data frame4 1930).

In case an error occurs in the Ack frame/block ACK frame by using the above-described method, unnecessary re-transmission procedure may not be performed. Most particularly, in case the AP recognizes that error occurs frequently in the ACK frame/block ACK frame being transmitted to a specific MU group (STA group targeted for DL MU transmission), the method for transmitting a trigger frame including the block ACK information (PBA information) may be more effective.

Figure 20:
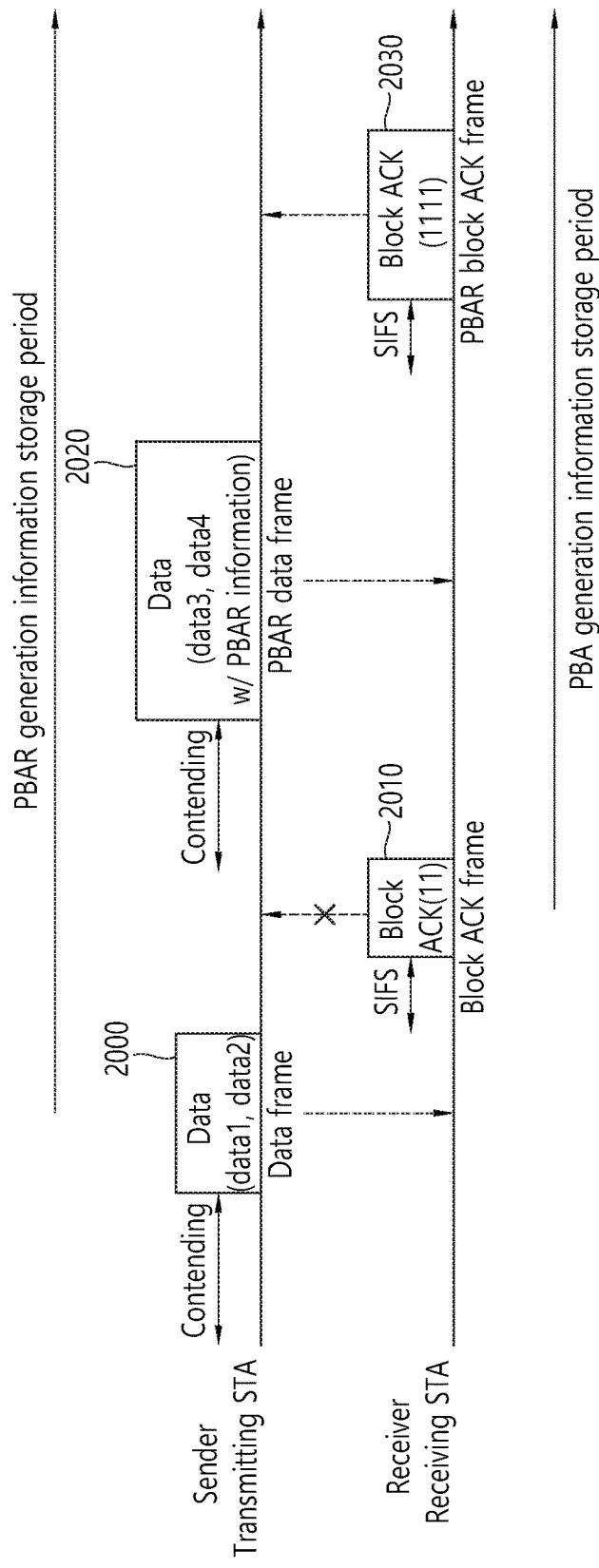
FIG. 20 is a conceptual view illustrating operations of a transmitting STA and a receiving STA when performing the error recovery procedure according to an exemplary embodiment of the present invention.

FIG. 20 is a conceptual view illustrating operations of a transmitting STA and a receiving STA when performing the error recovery procedure according to an exemplary embodiment of the present invention.

Referring to FIG. 20, in case the transmitting STA sets the ACK policy to immediate ACK (block ACK) transmission and transmits a data frame, information corresponding to the data frame may be stored for a predetermined period of time. For example, the information corresponding to the data frame may include information for generating PBAR information (e.g., sequence of data units included in the data frame, ACK policy, TID, and so on). The information corresponding to the data frame for the error recovery procedure according to the exemplary embodiment of the present invention may be expressed by using the term PBAR generation information.

In case the transmitting STA fails to receive a block ACK frame 2010 corresponding to a data frame 2000, the transmitting STA may generate and transmit a PBAR data frame 2020 based on the PBAR generation information, which is stored for a predetermined period of time.

After receiving the data frame based on the ACK policy, which is set to immediate ACK (block ACK) transmission, the receiving STA may immediately transmit a block ACK frame. The receiving STA may store information corresponding to the data frame 2000, which is received after the transmission of the block ACK frame, for a predetermined period of time. The information corresponding to the received data frame 2000, which is being stored for a predetermined period of time, may be expressed by using the term PBA generation information.

Thereafter, in case the PBAR information is received through a PBAR data frame 2020, the receiving STA may transmit a PBAR block ACK frame 2030 including the PBA information to the transmitting STA based on the stored PBA generation information.

Although the PBAR generation information and the PBA generation information are differentiated from one another, the PBAR generation information and the PBA generation information may correspond to the same information.

Figure 21:
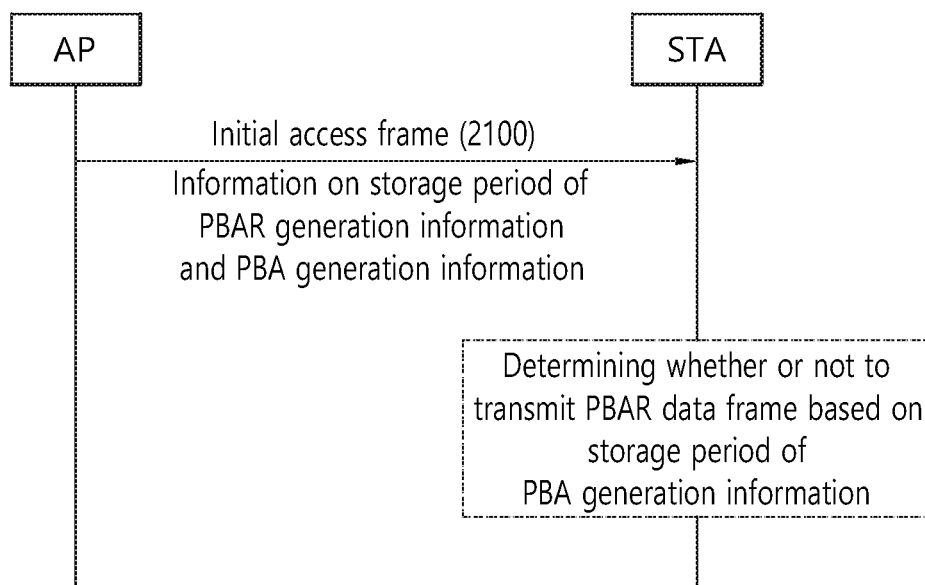
FIG. 21 is a conceptual view illustrating a preliminary configuration protocol for the error recovery procedure according to an exemplary embodiment of the present invention.

FIG. 21 is a conceptual view illustrating a preliminary configuration protocol for the error recovery procedure according to an exemplary embodiment of the present invention.

According to the exemplary embodiment of the present invention, the AP and the STA may determine whether or not an error recovery procedure according to the exemplary embodiment of the present invention is performed based on the protocol, which is described below.

The AP may transmit information related to the PBAR generation information and/or PBA generation information to the STA through an initial access frame (e.g., beacon frame, probe response frame, association response frame) 2100, which is used in an initial access procedure, or through a separate management frame.

For example, a capability field of the initial access frame 2100 is added to a new field (PBAR storage period field), and the PBAR storage period field may include information on a storage period of the PBAR generation information and/or PBA generation information. The information on a storage period of the PBAR generation information and/or PBA generation information may be expressed in a predetermined unit (e.g., msec).

For example, the AP may notify the STA that the AP will be storing the PBA generation information (or data frame) related to all of the data frames that are received by the AP during a period of 100 msec through the PBAR storage period field.

The STA may transmit the data frame but may not receive the block ACK frame, which is transmitted by the AP as a response to the data frame.

In case the STA determines the non-reception cause of the block ACK frame as the transmission failure of the block ACK frame by the AP, the STA may transmit a PBAR data frame based on the information on the storage period of the PBA generation information, which is acquired through the PBAR storage period field, and may then determine whether or not to request a PBA block ACK frame including the PBA information.

In case the storage period of the PBA generation information of the AP is not expired, the STA may request for a PBA block ACK frame including the PBA information to the AP through the PBAR data frame. Conversely, in case the storage period of the PBA generation information of the AP is expired, the STA may perform the conventional error recovery procedure of re-transmitting the data frame to the AP.

By using the same method, the STA may transmit the PBAR generation information and/or PBA generation information to the AP through an initial access frame (e.g., probe request frame, association request frame), which is used in an initial access procedure, or through a separate management frame.

For example, information on the storage period of the PBAR generation information and/or PBA generation information may be transmitted based on the PBAR storage period field, which is included in the capability field of the initial access frame.

In case the AP transmits a data frame and the STA transmits an ACK frame as a response to the data frame, the AP may determine whether to perform the error recovery procedure according to the exemplary embodiment of the present invention or whether to perform the conventional error recovery procedure based on the PBAR storage period field, which is transmitted by the STA.

Figure 22:
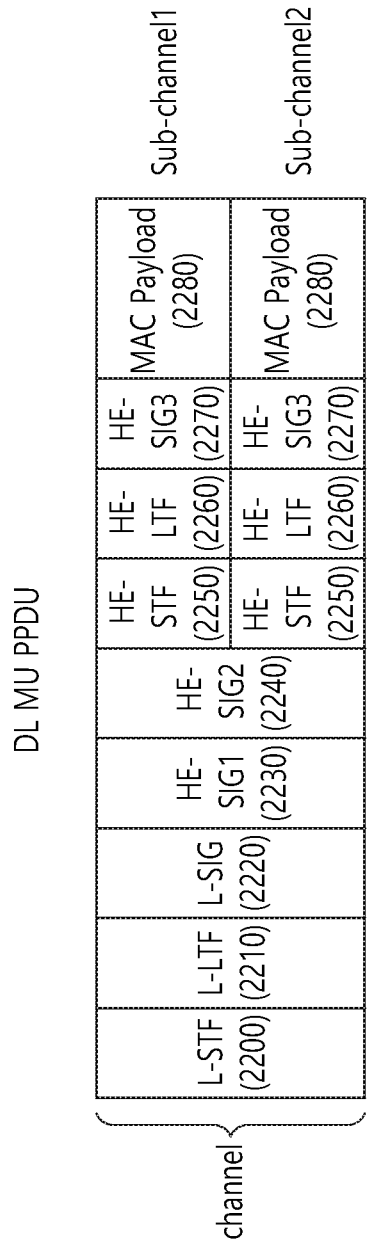
FIG. 22 is a conceptual view illustrating a DL MU PPDU format according to an exemplary embodiment of the present invention.

FIG. 22 is a conceptual view illustrating a DL MU PPDU format according to an exemplary embodiment of the present invention.

The DL MU PPDU, which is disclosed in FIG. 22, may carry (or deliver) a plurality of data frames being transmitted to a plurality of receiving STAs by the AP, which performs the function of a transmitting STA. Additionally, the DL MU PPDU may carry a plurality of block ACK frames being transmitted to a plurality of transmitting STAs by the AP, which performs the function of a receiving STA.

Referring to FIG. 22, the DL MU PPDU may include a legacy PPDU header, an HE PPDU header, and a MAC payload.

The legacy PPDU header may include L-STF, L-LTF, and L-SIG.

The L-STF 2200 may include a short training orthogonal frequency division multiplexing (OFDM) symbol. The L-STF 2200 may be used for frame detection, automatic gain control (AGC), diversity detection, and coarse frequency/time synchronization.

The L-LTF 2210 may include a long training orthogonal frequency division multiplexing (OFDM) symbol. The L-LTF 2210 may be used for fine frequency/time synchronization and channel prediction.

The L-SIG 2220 may be used for transmitting control information. The L-SIG 2220 may include information on data transmission rate, data length, and so on.

The HE PPDU header may include an HE-SIG1 2230, an HE-SIG2 2240, an HE-STF 2250, an HE-LTF 2260, and an HE-SIG3 2270.

The HE-SIG1 2230 may include common information (bandwidth (BW), guard interval (GI) length, BSS index, cyclic redundancy check (CRC), tail bit, and so on) for performing decoding of the DL MU PPDU.

More specifically, the HE-SIG1 2230 may include color bits for BSS identification, a bit indicating a total bandwidth size through which the DL MU PPDU is transmitted, a tail bit, a CRC bit, and a bit indicating a cyclic prefix (CP) (or guard interval (GI)) length. The bit indicating the total bandwidth size through which the DL MU PPDU is transmitted may also indicate a contiguous frequency resource or a non-contiguous frequency resource for transmitting the DL MU PPDU.

Moreover, the HE-SIG1 2230 may further include information related to the HE-SIG2 2240. For example, the HE-SIG1 2230 may further include information on a MCS being applied to the HE-SIG2 2240 and information on a number of OFDM symbols being allocated for the HE-SIG2 2240.

Also, the HE-SIG1 2230 may also include information on a time-spatial stream. For example, the information on a time-spatial stream may include information on a number of time-spatial streams used for the transmission of the MAC payload in each of the plurality of sub-channels through which the DL MU PPDU is transmitted.

Additionally, the HE-SIG1 2230 may also include information on beamforming of the time-spatial stream and information related to clear channel assessment (CCA) and power control of the STA.

The HE-SIG2 2240 may include information on each of the plurality of STAs that are to receive the DL MU PPDU. For example, the HE-SIG2 2240 may include identification information (e.g., partial association identifier (PAID), group identifier (GID)) of the plurality of STAs that are to receive the DL MU PPDU.

Moreover, the HE-SIG2 2240 may include information on the resources being allocated to each of the plurality of STAs that are to receive the DL MU PPDU. More specifically, the HE-SIG2 2240 may also include OFDMA based resource allocation information (or MU-MIMO information) corresponding to each of the plurality of STAs that are to receive the DL MU PPDU. For example, the HE-SIG2 2240 may include information on an allocated sub-channel and/or allocated time-spatial stream of a field (e.g., HE-STF 2250, HE-LTF 2260, HE-SIG3 2270, and MAC payload 2280) after the HE-SIG2 2240, which is transmitted to each of the plurality of STAs.

The HE-SIG1 2230 or the HE-SIG2 2240 may include the above-described PBAR information or PBA information.

As a transmitting STA, in case the AP carries at least one PBAR data frame based on the DL MU PPDU, and in case the PBAR information is included in the HE-SIG1 2230, the HE-SIG1 2230 may include PBAR information that is related to data units being transmitted to at least one STA receiving at least one PBAR data frame, among a plurality of STAs that are targeted for the DL MU PPDU. In case the AP carries a PBAR data frame based on the DL MU PPDU, and in case the PBAR information is included in the HE-SIG2 2240, the HE-SIG2 2240 may only include the PBAR information that is related to the data units being transmitted to the STA receiving the PBAR data frame through a transmission resource (e.g., sub-channel) of the HE-SIG2 2240.

As a receiving STA, in case the AP carries at least one PBAR block ACK frame to at least one STA based on the DL MU PPDU, and in case the PBA information is included in the HE-SIG1 2230, the HE-SIG1 2230 may include PBA information that is related to data units being transmitted by at least one STA receiving the at least one PBAR block ACK frame. In case the AP carries a PBAR block ACK frame based on the DL MU PPDU, and in case the PBA information is included in the HE-SIG2 2240, the HE-SIG2 2240 may only include the PBA information that is related to the data units being transmitted by the STA receiving the PBAR block ACK frame through a transmission resource (e.g., sub-channel) of the HE-SIG2 2240.

The HE-STF 2250 may be used for enhancing automatic gain control estimation in a multiple input multiple output (MIMO) environment or an OFDMA environment. More specifically, the HE-STF 2250 may be used for the automatic gain control estimation and channel estimation for the decoding of a field after the HE-STF 2250 being transmitted through the same sub-channel as the sub-channel through which the HE-STF 2250 is transmitted.

The HE-LTF 2260 may be used for estimating a channel in a MIMO environment or an OFDMA environment. More specifically, the HE-LTF 2260 may be used for the channel estimation for the decoding of a field after the HE-LTF 2260 being transmitted through the same sub-channel as the sub-channel through which the HE-LTF 2260 is transmitted.

The HE-SIG3 2270 may include information for performing decoding of the MAC payload. The information for decoding the MAC payload may include MCS, Coding, space time block coding (STBC), transmit beamforming (TXBF), and so on. More specifically, the HE-SIG3 2270 may include information on the MCS being applied to the MAC payload, which is transmitted through the same sub-channel as the sub-channel through which the HE-SIG3 2270 is transmitted, and information on the STBC and TXBF used for the transmission of the MAC payload. The information being included in the HE-SIG3 2270 may be included in the HE-SIG2 2240. And, in this case, the HE-SIG3 2270 may not be included in the DL MU PPDU as a separate field.

Each of the plurality of MAC payloads being included in the DL MU PPDU may include downlink data that are to be transmitted to each STA. The MAC payload may include a MAC header and a MSDU (or MAC body). The MAC header may include a duration/ID field including information corresponding to a time resource for a transmission procedure of the DL MU PPDU, an identifier of a transmitting STA transmitting the MAC payload (or frame), an identifier of a receiving STA for receiving the MAC payload (or frame), and so on. The MSDU may include downlink data. The MAC header or MSDU may also include the above-described PBAR information or PBA information.

In the DL MU PPDU being transmitted via downlink (from the AP to the STA), the L-STF 2200, the L-LTF 2210, the L-SIG 2220, and the HE-SIG1 2230 may be encoded to a plurality of sub-channel units (or channel units). The HE-SIG1 2230, which is encoded to a plurality of sub-channel units (or channel units), may be transmitted in a duplicated format within the entire bandwidth.

The duplicated format may be generated based on a replication (or duplication) of a field, which is transmitted within a specific band. In case a duplicated format is used, a field of a specific band may be replicated (or duplicated), and, then, the replicated (or duplicated) field may be transmitted within a plurality of bands.

The L-STF 2200, the L-LTF 2210, the L-SIG 2220, and the HE-SIG1 2230 may be encoded within a channel including the sub-channel1 and the sub-channel2 and may then be transmitted. In case the entire bandwidth through which the DL MU PPDU is being transmitted includes a plurality of channels, the L-STF 2200, the L-LTF 2210, the L-SIG 2220, and the HE-SIG1 2230, which are encoded in channel units, may also be transmitted through other channels including other sub-channels. Additionally, in case the entire bandwidth being allocated to the MU PPDU includes a plurality of channels, the HE-SIG1 2230, which is encoded in channel units, may be replicated (or duplicated) and may then be transmitted within another channel including other sub-channels.

The HE-SIG2 2240 may be encoded and transmitted to the DL MU PPDU through the entire allocated band. For example, in case the entire allocated band allocated to the DL MU PPDU is equal to 40 MHz, the HE-SIG2 2240 may be encoded and transmitted in the 40 MHz band. In FIG. 20, a case when the entire band that is allocated to the DL MU PPDU is equal to 20 MHz is assumed. According to another exemplary embodiment of the present invention, the HE-SIG2 2240 may be encoded and transmitted in channel units through the entire band being allocated to the DL MU PPDU. For example, in case the size of the channel band is equal to 20 MHz, the HE-SIG2 2240 may be encoded and transmitted in band units of 20 MHz. In case the HE-SIG2 2240 is encoded in channel units, the HE-SIG2 2240 may include only information corresponding to an STA group receiving the DL MU PPDU through a specific channel among the plurality of STAs receiving the DL MU PPDU. More specifically, the HE-SIG2 2240 may include identification information of the STA group receiving the DL MU PPDU within a channel through which the HE-SIG2 2240 is transmitted, and resource allocation information corresponding to an STA being included in the STA group.

The HE-STF 2250, the HE-LTF 2260, and the HE-SIG3 2270 may be encoded and transmitted within a frequency resource (sub-channel) that is allocated to each of the plurality of STAs receiving downlink data through the DL MU PPDU. For example, a case when each of the sub-channel 1 and the sub-channel2 is respectively allocated to the STA1 and the STA2 may be assumed. In this case, the HE-STF 2250, the HE-LTF 2260, and the HE-SIG3 2270 may be encoded in each of the sub-channel 1 and the sub-channel2 and may be transmitted to each of the STA1 and the STA2. The HE-STF 2250, the HE-LTF 2260, and the HE-SIG3 2270 being transmitted through each of the sub-channel1 and the sub-channel2 may include separate training field information and control information for the decoding of a MAC payload 2280 of each of the STA1 and the STA2.

The STA1 and the STA2 may receive the L-STF 2200, the L-LTF 2210, the L-SIG 2220, and the HE-SIG 2230. The L-STF 2200 and the L-LTF 2210 may be used for the decoding of the L-SIG 2220 and the HE-SIG1 2230 and the HE-SIG2 2240. The STA1 and the STA2 may acquire information on the entire bandwidth (e.g., 40 MHz) through which the HE-SIG2 2240 is transmitted based on the bandwidth information included in the HE-SIG1 2230. Each of the STA1 and the STA2 may acquire information corresponding to the resource (e.g., sub-channel) being allocated to each of the STA1 and the STA2, which is included in the HE-SIG2 2240, and, then, each of the STA1 and the STA2 may receive the HE-STF 2250, the HE-LTF 2260, the HE-SIG3 2270, and the MAC payload 2280, which are transmitted through an allocated sub-channel.

The HE-STF 2250 and the HE-LTF 2260 may be used for channel estimation for performing the decoding of the HE-SIG3 2270 and the MAC payload 2280. Each of the STA1 and the STA2 may perform decoding on the MAC payload 2280, which is transmitted through an allocated sub-channel based on the HE-STF 2250, the HE-LTF 2260, and the HE-SIG3 2270.

Figure 23:
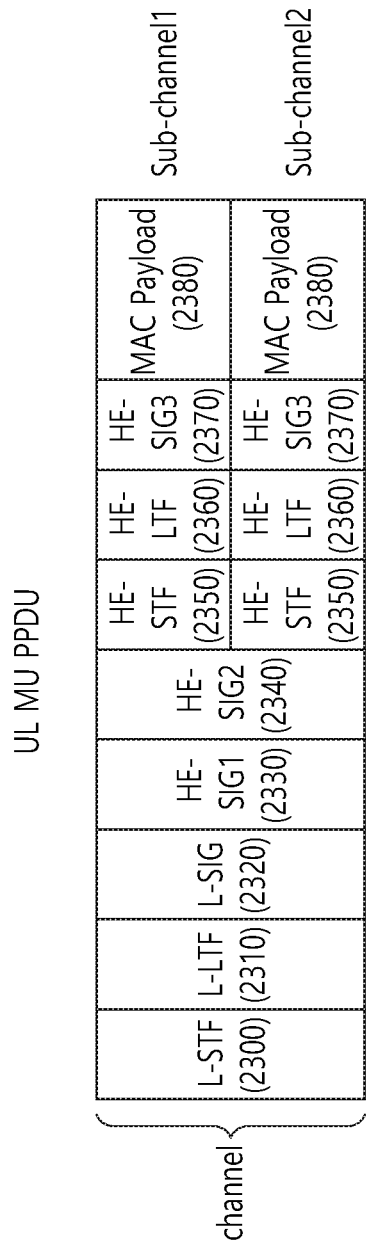
FIG. 23 is a conceptual view illustrating a UL MU PPDU according to an exemplary embodiment of the present invention.

FIG. 23 is a conceptual view illustrating a UL MU PPDU according to an exemplary embodiment of the present invention.

FIG. 23 discloses a UL MU PPDU format that is transmitted by a plurality of UL MU target STAs through an entire band being allocated to the plurality of UL MU target STAs. The UL MU PPDU, which is disclosed in FIG. 23, is disclosed in the viewpoint of the AP. More specifically, the UL MU PPDU, which is disclosed in FIG. 23, may include each of a plurality of UL MU PPPDU being transmitted by each of a plurality of UL MU target STAs. The UL MU target STA indicates an STA transmitting the UL MU PPDU.

The UL MU PPDU, which is disclosed in FIG. 23, may carry a data frame being transmitted to the AP by a plurality of STAs performing the function of a transmitting STA. Also, the UL MU PPDU, which is disclosed in FIG. 23, may carry a block ACK frame being transmitted to the AP by a plurality of STAs performing the function of a receiving STA.

Referring to FIG. 23, the UL MU PPDU may include a PPDU header (legacy PPDU header, HE PPDU header) and a MAC payload.

The legacy PPDU header may include L-STF 2300, L-LTF 2310, and L-SIG 2320.

Each of the L-STF 2300, the L-LTF 2310, and the L-SIG 2320 of the UL MU PPDU may perform the same functions as each of the L-STF, the L-LTF, and the L-SIG of the DL MU PPDU. For example, the L-STF 2300 and the L-LTF 2310 may be used for the channel prediction for performing decoding on a field that is transmitted later on. The L-SIG 2320 may information control information, such as information on the data transmission rate and data length.

The HE PPDU header may include HE-SIG1 2330, HE-STF 2340, HE-LTF 2350, and HE-SIG3 2360.

The HE-SIG1 2330 may include common information (BW, GI length, BSS index, cyclic redundancy check (CRC), tail bit, and so on) for performing decoding of the UL MU PPDU. More specifically, the HE-SIG1 2330 may include color bits for BSS identification, a bit indicating a total size of the bandwidth through which the UL MU PPDU is transmitted, a tail bit, a CRC bits, and a bit indicating CP (or GI) length. Part of the information being included in the HE-SIG1 2330 may be determined based on control information for the UL MU transmission, which is included in a trigger frame.

The L-STF 2300, the L-LTF 2310, the L-SIG 2320, and the HE-SIG1 2330 may be encoded and transmitted in channel units. In FIG. 23, a channel having the size of 20 MHz is assumed, and the L-STF 2300, the L-LTF 2310, the L-SIG 2320, and the HE-SIG1 2330 may be encoded and transmitted in 20 MHz units.

The HE-SIG2 2340 may be encoded and transmitted within the entire bandwidth. The entire bandwidth may correspond to an entire frequency bandwidth that is allocated by the trigger frame for the transmission of the UL MU PPDU by each of the plurality of UL MU target STAs. In FIG. 23, the entire bandwidth size (or total bandwidth size) may be equal to 20 MHz, and the HE-SIG2 2340 may be encoded and transmitted in 20 MHz units.

The HE-SIG2 2340 may include information on each of the plurality of UL MU target STAs transmitting the UL MU PPDU based on the trigger frame. For example, the HE-SIG2 2340 may include identification information (e.g., PAID, GID) of a plurality of UL MU target STAs that are to transmit the UL MU PPDU. Also, the HE-SIG2 2340 may include information on resource being allocated to each of the plurality of UL MU target STAs for the transmission of the HE-STF 2350, the HE-LTF 2360, the HE-SIG3 2370, and the MAC payload 2380 by each of the plurality of UL MU target STAs within the UL MU PPDU. The UL MU target STA may generate the HE-SIG2 2340 based on information included in the trigger frame (e.g., identification information of the UL MU target STA, information on a resource being allocated to the UL MU target STA).

The HE-SIG1 2330 or the HE-SIG2 2340 may include the above-described PBAR information or the PBA information.

As a transmitting STA, in case at least one UL MU target STA, among the plurality of UL MU target STAs, carries at least one PBAR data frame based on the MU PPDU, and in case PBAR information is included in the HE-SIG1 2330, the HE-SIG1 2330 may include PBAR information being related to a data unit that is transmitted by at least one UL MU target STA transmitting at least one PBAR data frame. Among the plurality of UL MU target STAs, in case at least one UL MU target STA carries at least one PBAR data frame based on the MU PPDU, and in case PBAR information is included in the HE-SIG2, the HE-SIG2 2340 may only include PBAR information being related to the data unit that is transmitted by the UL MU target STA, which transmits the PBAR data frame through a transmission resource (e.g., sub-channel) of the HE-SIG2 2340.

In case at least one UL MU target STA, among the plurality of UL MU target STAs, carries at least one PBAR block ACK frame based on the MU PPDU, and in case PBA information is included in the HE-SIG1 2330, the HE-SIG1 2330 may include PBA information being related to a data unit that is received by at least one UL MU target STA transmitting at least one PBAR block ACK frame. Among the plurality of UL MU target STAs, in case at least one UL MU target STA carries at least one PBAR block ACK frame based on the UL MU PPDU, and in case PBA information is included in the HE-SIG2 2340, the HE-SIG2 2340 may only include PBA information being related to the data unit that is received by the UL MU target STA, which transmits the PBAR block ACK frame through a transmission resource (e.g., sub-channel) of the HE-SIG2 2340.

According to another exemplary embodiment of the present invention, the HE-SIG2 2340 may also be encoded in channel units and then transmitted, and the HE-SIG2 2340 may also include only the identification information of the UL MU target STA being allocated to sub-channels included in the channel and the allocation information of each of the sub-channels included in the channel.

According to yet another exemplary embodiment of the present invention, the UL MU PPDU may not include the HE-SIG2 2340. Information indicating each of the plurality of UL MU target STAs and resource allocation information corresponding to each of the plurality of UL MU target STAs may be transmitted through a trigger frame, which is transmitted by the AP. The information indicating each of the plurality of UL MU target STAs and the resource allocation information corresponding to each of the plurality of UL MU target STAs may correspond to information that are determined by the AP. Therefore, the AP is not required to receive the information indicating each of the plurality of UL MU target STAs and the resource allocation information corresponding to each of the plurality of UL MU target STAs through the HE-SIG2 2340. Therefore, the UL MU PPDU may not include the HE-SIG2 2340.

In the UL MU PPDU, each of the HE-STF 2340, the HE-LTF 2350, the HE-SIG3 2360, and the MAC payload 2370 may be included in each of the plurality of sub-channels and then be transmitted.

Each of the HE-STF 2340 and the HE-LTF 2350 of the UL MU PPDU may perform the same functions as each of the HE-STF and the HE-LTF of the DL MU PPDU. For example, the HE-STF 2340 and the HE-LTF 2350 may be used for channel estimation for performing the decoding of a field that is transmitted within the same sub-channels as the sub-channels through which the HE-STF 2340 and the HE-LTF 2350 are transmitted.

The HE-SIG3 2360 may include information for performing decoding of the MAC payload 2370. The information for decoding the MAC payload 2370 may include MCS, Coding, STBC, TXBF, and so on. More specifically, the HE-SIG3 2360, which is transmitted through each of the plurality of sub-channels, may include information on the MCS being applied to the MAC payload 2370, which is transmitted through each of the plurality of sub-channels, and information on the STBC and TXBF used for the transmission of the MAC payload 2370.

In FIG. 23, although the UL MU PPDU including the HE-SIG3 2360 is assumed, information (MCS, Coding, STBC, TXBF, and so on) being included in the HE-SIG3 2360 may correspond to the same information as the information being determined by the AP and then transmitted through the trigger frame. Therefore, the HE-SIG3 2360 may also not be included in the UL MU PPDU.

The MAC payload 2370 may include uplink data of a UL MU target STA that is triggered by the AP. The MAC payload may include a MAC header and an MSDU (or MAC body). The MAC header or the MSDU may also include the above-described PBAR information or PBA information.

A case when the AP allocates each of the sub-channel1 and the sub-channel2 to each of UL MU target STA1 and UL MU target STA2 based on the trigger frame and triggers uplink transmission may be assumed herein.

The AP may receive the L-STF 2300, the L-LTF 2310, the L-SIG 2320, and the HE-SIG1 2330, which are transmitted within the channel. Also, AP may receive the HE-STF 2340, the HE-LTF 2350, the HE-SIG3 2360, and the MAC payload 2370, which are transmitted by each of the STA1 and the STA2 through each of the sub-channel 1 and the sub-channel2.

Figure 24:
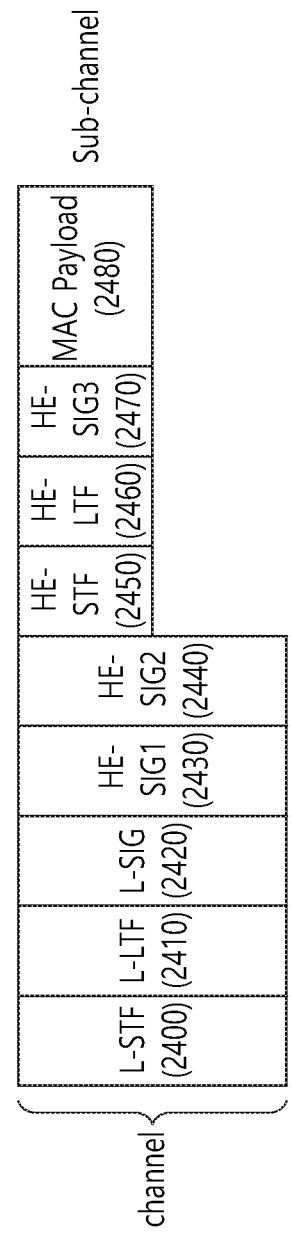
FIG. 24 is a conceptual view illustrating a UL MU PPDU being transmitted by a UL MU target STA according to an exemplary embodiment of the present invention.

FIG. 24 is a conceptual view illustrating a UL MU PPDU being transmitted by a UL MU target STA according to an exemplary embodiment of the present invention.

FIG. 24 discloses a UL MU PPDU being transmitted by one UL MU target STA among a plurality of UL MU target STAs. The UL MU PPDU, which is disclosed in FIG. 24, is disclosed in the viewpoint of the STA. More specifically, the UL MU PPDU that is disclosed in FIG. 24 may correspond to a UL MU PPDU that is transmitted by one UL MU target STA.

In FIG. 24, a case when the AP allocates each of the sub-channel1 and the sub-channel2 to each of UL MU target STA1 and UL MU target STA2 based on the trigger frame and triggers uplink transmission may be assumed.

Referring to FIG. 24, the UL MU target STA1 may transmit UL MU PPDU1 as a response to the trigger frame. The UL MU PPDU1 may include a data frame, which is transmitted by the UL MU target STA1.

The UL MU PPDU1 may include L-STF 2400, L-LTF 2410, L-SIG 2420, HE-SIG1 2430, and HE-SIG2 2440, which are transmitted through the channel, and HE-STF 2450, HE-LTF 2460, HE-SIG3 2470, and MAC payload 2480, which are transmitted through sub-channel1 being included in the channel.

By using the same method, the UL MU target STA2 may transmit UL MU PPDU2 as a response to the trigger frame. The UL MU PPDU2 may include the L-STF, L-LTF, L-SIG, HE-SIG1, and HE-SIG2, which are transmitted through the channel, and the HE-STF, HE-LTF, HE-SIG3, and MAC payload, which are transmitted through sub-channel2 being included in the channel. The L-STF 2400, the L-LTF 2410, the L-SIG 2420, the HE-SIG1 2430, and the HE-SIG2 2440, which are transmitted by UL MU target STA1, and the L-STF, the L-LTF, the L-SIG, the HE-SIG1, and the HE-SIG2, which are transmitted by UL MU target STA2, may include the same information and may be transmitted through the same channel. Alternatively, each of the L-STF 2400, the L-LTF 2410, the L-SIG 2420, and the HE-SIG1 2430, which are transmitted by UL MU target STA1, and the L-STF, the L-LTF, the L-SIG, the HE-SIG1, which are transmitted by UL MU target STA2, may each include different information and may each be coded by a different orthogonal code and may be transmitted through the same channel.

Figure 25:
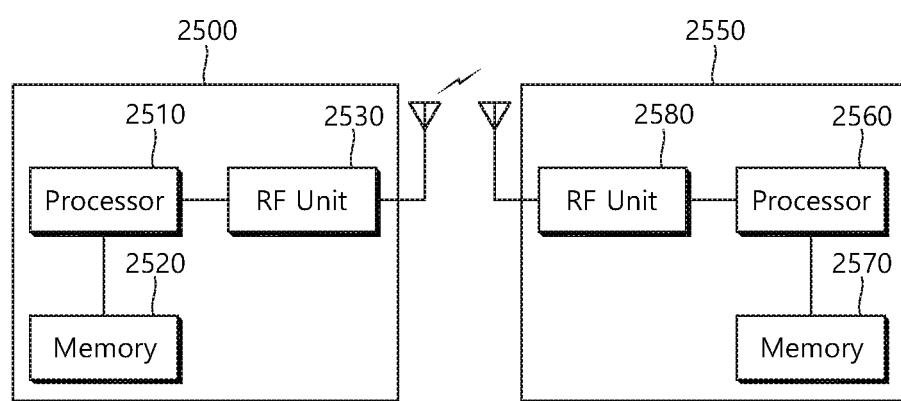
FIG. 25 is a block view illustrating a wireless device to which the exemplary embodiment of the present invention can be applied.

FIG. 25 is a block view illustrating a wireless device to which the exemplary embodiment of the present invention can be applied.

Referring to FIG. 25, the AP 2500 includes a processor 2510, a memory 2520, and a radio frequency (RF) unit 2530.

The RF unit 2530 is connected to the processor 2510, thereby being capable of transmitting and/or receiving radio signals.

The processor 2510 implements the functions, processes, and/or methods proposed in the present invention. For example, the processor 2510 may be implemented to perform the operations of the AP according to the above-described exemplary embodiments of the present invention. The processor may perform the operations of the AP, which are disclosed in the exemplary embodiments of FIG. 1 to FIG. 24.

For example, in case an AP operating as a transmitting STA transmits a data frame to a receiving STA, and in case the AP fails to receive a block ACK frame corresponding to the data frame from the receiving STA, the processor 2510 may be configured to determine a non-reception cause of the data frame. Also, in case the AP determines the non-reception cause of the data frame as a transmission failure of a block ACK frame by the receiving STA after the reception of the data frame by the receiving STA, the processor 2510 may be configured to transmit a PBAR data frame to the receiving STA and to receive a PBAR block ACK frame from the receiving STA as a response to the PBAR data frame. The PBAR data frame may include information for requesting a first block ACK bitmap corresponding to the data frame, and the PBAR block ACK frame may include the first block ACK bitmap corresponding to the data frame.

The STA 2550 includes a processor 2560, a memory 2570, and a radio frequency (RF) unit 2580.

The RF unit 2580 is connected to the processor 2560, thereby being capable of transmitting and/or receiving radio signals.

The processor 2560 implements the functions, processes, and/or methods proposed in the present invention. For example, the processor 2560 may be implemented to perform the operations of the STA according to the above-described exemplary embodiments of the present invention. The processor 2560 may perform the operations of the STA, which are disclosed in the exemplary embodiments of FIG. 1 to FIG. 25.

For example, the processor 2560 may be configured so that an STA operating as the receiving STA can receive a PBAR data frame and transmit a block ACK frame including PBA information based on the PBAR information.

The processor 2510 and 2560 may include an application-specific integrated circuit (ASIC), another chip set, a logical circuit, a data processing device, and/or a converter converting a baseband signal and a radio signal to and from one another. The memory 2520 and 2570 may include a read-only memory (ROM), a random access memory (RAM), a flash memory, a memory card, a storage medium, and/or another storage device. The RF unit 2530 and 2580 may include one or more antennas transmitting and/or receiving radio signals.

When the exemplary embodiment is implemented as software, the above-described method may be implemented as a module (process, function, and so on) performing the above-described functions. The module may be stored in the memory 2520 and 2570 and may be executed by the processor 2510 and 2560. The memory 2520 and 2570 may be located inside or outside of the processor 2510 and 2560 and may be connected to the processor 2510 and 2560 through a diversity of well-known means.

What is claimed is:

1. An error recovery method in a wireless local area network (WLAN) system, the method comprising:
   transmitting, by a first station (STA), a first data frame including a plurality of first data units to a second STA;
   determining, by the first STA, whether a wireless medium of the WLAN system is in a busy state within a predetermined period when an inter-frame interval has elapsed since the transmission of the first data frame;
   determining, by the first STA, a non-reception cause of a first block acknowledgement (BA) frame for the first data frame as a collision between the first BA frame and an interference frame when the wireless medium is determined to be in the busy state within the predetermined period,
   wherein the first BA frame includes a first bitmap related to a reception state for each of the plurality of first data units;
   transmitting, by the first STA, a second data frame including a plurality of second data units to the second STA when the non-reception cause is determined as the collision between the first BA frame and the interference frame,
   wherein the second data frame further includes previous block acknowledgement response (PBAR) information for requesting the first bitmap from the second STA; and
   receiving, by the first STA, a second BA frame from the second STA in response to the second data frame, wherein the second BA frame includes both the first bitmap and a second bitmap related to a reception state for each of the plurality of second data units.

2. The method of claim 1, wherein the PBAR information includes a block ACK starting sequence field, and
wherein the block ACK starting sequence field includes information on a sequence number of a first data unit that is to correspond to a first bit of the first bitmap, among the plurality of first data units included in the first data frame.

3. The method of claim 2, wherein the second data frame further includes a traffic identifier (TID) information field,
wherein the TID information field includes TID information, and
wherein the first bitmap includes only ACK information corresponding to at least one first data unit corresponding to the TID information among the plurality of first data units included in the first data frame.

4. The method of claim 1, wherein the second BA frame further includes previous block acknowledgement (PBA) information,
wherein the PBA information includes a BA sequence field,
wherein the BA sequence field includes information on a sequence number of a first data unit that is to correspond to a first bit of the first bitmap among the plurality of first data units included in the first data frame.

5. The method of claim 4, wherein the second BA frame further includes a traffic identifier (TID) information field,
wherein the TID information field includes TID information, and
wherein the first bitmap includes only ACK information corresponding to at least one first data unit corresponding to the TID information among the plurality of first data units included in the first data frame.

6. A first station (STA) transmitting data units in a wireless local area network (WLAN) system, the first STA comprising:
a radio frequency (RF) unit transmitting and receiving radio signals; and
a processor being operatively connected to the RF unit, wherein the processor is configured to:
transmit a first data frame including a plurality of first data units to a second STA;
determine whether a wireless medium of the WLAN system is in a busy state within a predetermined period when an inter-frame interval has elapsed since the transmission of the first data frame;
determine a non-reception cause of a first block acknowledgement (BA) frame for the first data frame as a collision between the first BA frame and an interference frame when the wireless medium is determined to be in the busy state within the predetermined period,
wherein the first BA frame includes a first bitmap related to a reception state for each of the plurality of first data units;
transmit a second data frame including a plurality of second data units to the second STA when the non-reception cause is determined as the collision between the first BA frame and the interference frame,
wherein the second data frame further includes previous block acknowledgement response (PBAR) information for requesting the first bitmap from the second STA; and
receive a second BA frame from the second STA in response to the second data frame,
wherein the second BA frame includes both the first bitmap and a second bitmap related to a reception state for each of the plurality of second data units.

7. The first STA of claim 6,
wherein the PBAR information includes a block ACK starting sequence field, and
wherein the block ACK starting sequence field includes information on a sequence number of a first data unit that is to correspond to a first bit of the first bitmap, among the plurality of first data units included in the first data frame.

8. The first STA of claim 7, wherein the second data frame further includes a traffic identifier (TID) information field,
wherein the TID information field includes TID information, and
wherein the first bitmap includes only ACK information corresponding to at least one first data unit corresponding to the TID information among the plurality of first data units included in the first data frame.

9. The first STA of claim 6, wherein the second BA frame further includes previous block acknowledgement (PBA) information,
wherein the PBA information includes a BA sequence field,
wherein the BA sequence field includes information on a sequence number of a first data unit that is to correspond to a first bit of the first bitmap among the plurality of first data units included in the first data frame.

10. The first STA of claim 9, wherein the second BA frame further includes a traffic identifier (TID) information field,
wherein the TID information field includes TID information, and
wherein the first bitmap includes only ACK information corresponding to at least one first data unit corresponding to the TID information among the plurality of first data units included in the first data frame.

* * * * *